(12) United States Patent
Lueck et al.

(10) Patent No.: US 9,546,867 B2
(45) Date of Patent: Jan. 17, 2017

(54) MULTI-FUNCTION LEVEL WITH A JOINABLE END

(75) Inventors: Michael T Lueck, Sunnyvale, CA (US); Russel J Borg, Campbell, CA (US)

(73) Assignee: THE REGULAR GUYS, LLC, Sunnyvale ( * ) Notice: Subject to any disclaimer, the term of this patent is extended or adjusted under 35 U.S.C. 154(b) by 29 days.

(21) Appl. No.: 13/823,875

(22) PCT Filed: Dec. 30, 2011

(86) PCT No.: PCT/US2011/068234
§ 371 (c)(1),
(2), (4) Date: Mar. 15, 2013

(87) PCT Pub. No.: WO2012/092611
PCT Pub. Date: Jul. 5, 2012

(65) Prior Publication Data
US 2013/0167387 A1    Jul. 4, 2013

Related U.S. Application Data

(60) Provisional application No. 61/429,011, filed on Dec. 31, 2010.

(51) Int. Cl.
 *G01C 9/26* (2006.01)
 *G01C 9/28* (2006.01)
(52) U.S. Cl.
 CPC .. *G01C 9/26* (2013.01); *G01C 9/28* (2013.01)

(58) Field of Classification Search
 CPC .................................. G01C 9/26; G01C 9/28
 USPC .................. 33/370, 374, 379, 381, 383, 385
 See application file for complete search history.

(56) References Cited

U.S. PATENT DOCUMENTS

| | | | |
|---|---|---|---|
| 2,559,961 A * | 7/1951 | Howell | 33/374 |
| 2,691,829 A * | 10/1954 | Bryan Arana | 33/374 |
| 4,317,289 A | 3/1982 | Conn | |
| 5,433,011 A * | 7/1995 | Scarborough et al. | 33/374 |
| 5,839,201 A | 11/1998 | Young | |
| 5,966,826 A | 10/1999 | Ho | |
| 6,029,359 A * | 2/2000 | Szumer | 33/374 |
| 6,041,510 A | 3/2000 | Hufff | |
| 6,293,023 B1 * | 9/2001 | Schooley | 33/374 |
| 7,086,166 B2 | 8/2006 | Helda et al. | |
| 7,290,346 B2 | 11/2007 | Szumer et al. | |
| 7,797,848 B2 | 9/2010 | Cobb et al. | |

(Continued)

FOREIGN PATENT DOCUMENTS

WO    WO2005/017452 A1    2/2005

OTHER PUBLICATIONS

International Search Report and Written Opinion from ISA/KIPO for PCT/US2011/068234 (related to TRG-102-US), ISR mail date Aug. 7, 2012.

(Continued)

*Primary Examiner* — G. Bradley Bennett

(57) ABSTRACT

An apparatus and method for measuring and marking level and plumb is providently disclosed herein. The multi-function level includes: modular ends that allow attachment of mating levels for linear extension in one direction. The modular, or jointed, end includes a structure to hold a connector or to selectively receive a connector from another level such that that only applies a load to the jointed end and not the body of the level.

20 Claims, 37 Drawing Sheets

(56) References Cited

U.S. PATENT DOCUMENTS

2002/0121025 A1    9/2002  Leite
2007/0197123 A1*  8/2007  Olivo et al. .................. 446/123
2012/0151785 A1*  6/2012  Lettkeman et al. ............ 33/379
2013/0326895 A1* 12/2013  Bureau ........................... 33/381

OTHER PUBLICATIONS

Reference from amazon.com (website excerpt) showing Stabila 33508 Extendable 5-8 Plate to Plate Level, Dated Mar. 3, 2013, http://www.amazon.com/Stabila-33508-Extendable-Plate-Level/dp/B00009OLHR.

International Preliminary Report on Patentability (IPRP), ISA/KIPO for PCT/US2011/068234 (related to TRG-102-US), mail date Jul. 2, 2013.

* cited by examiner

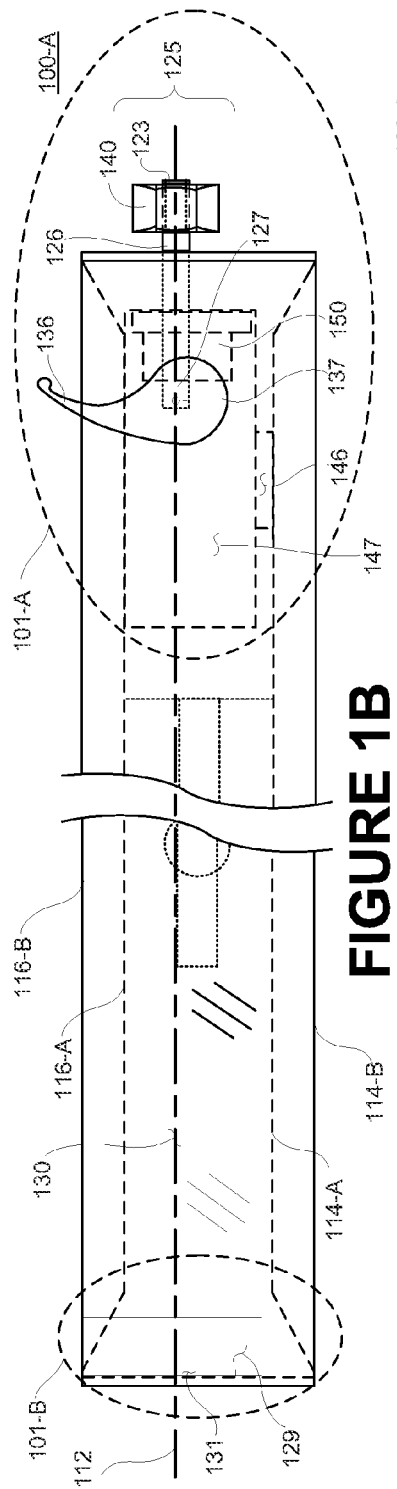
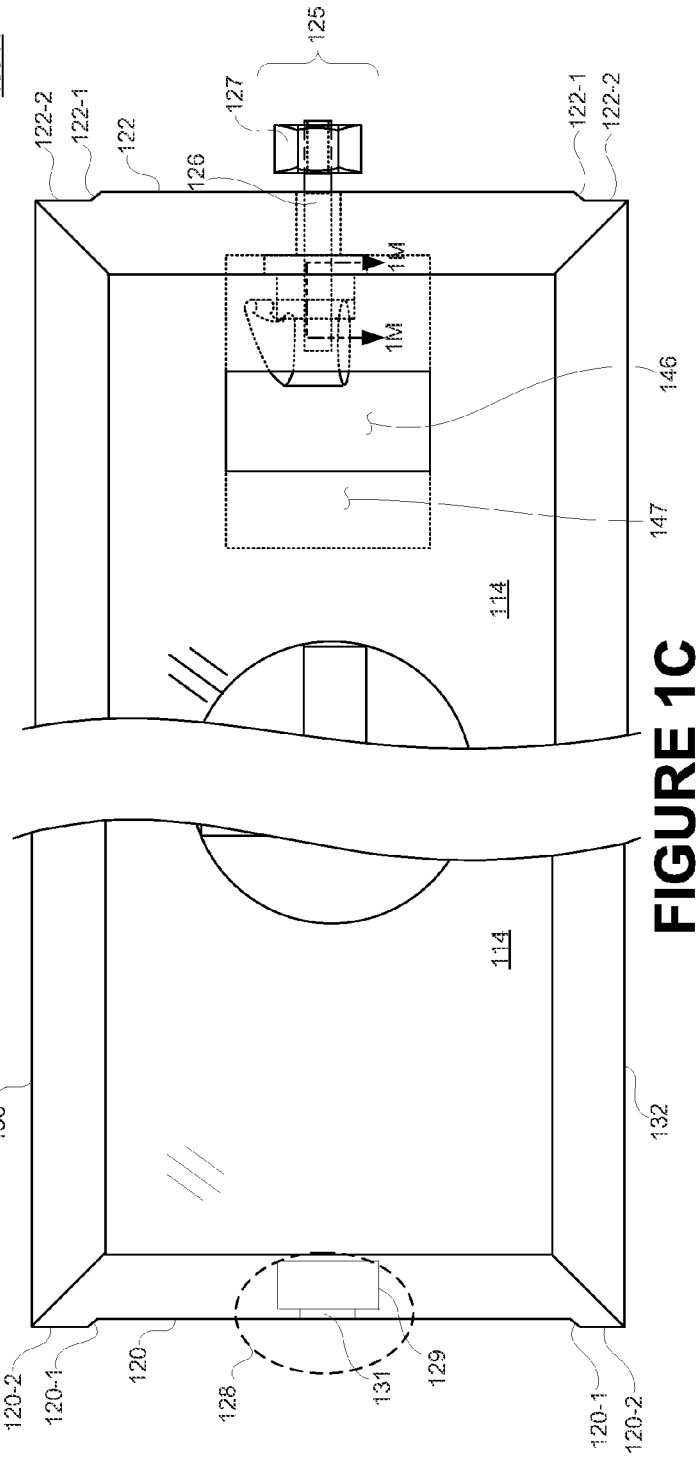
FIGURE 1B
FIGURE 1C

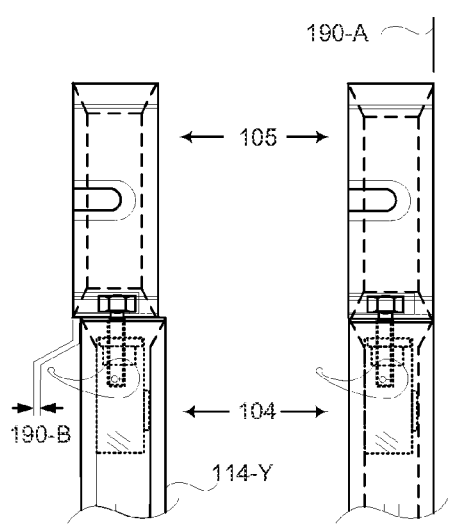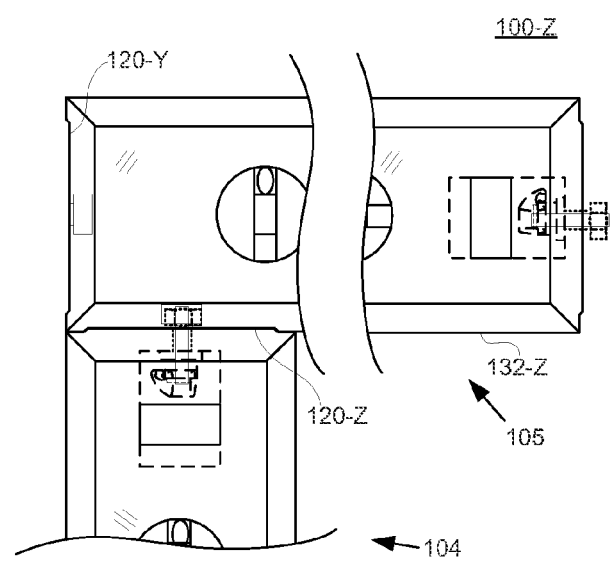
FIG 1X  FIG 1Y  FIGURE 1Z

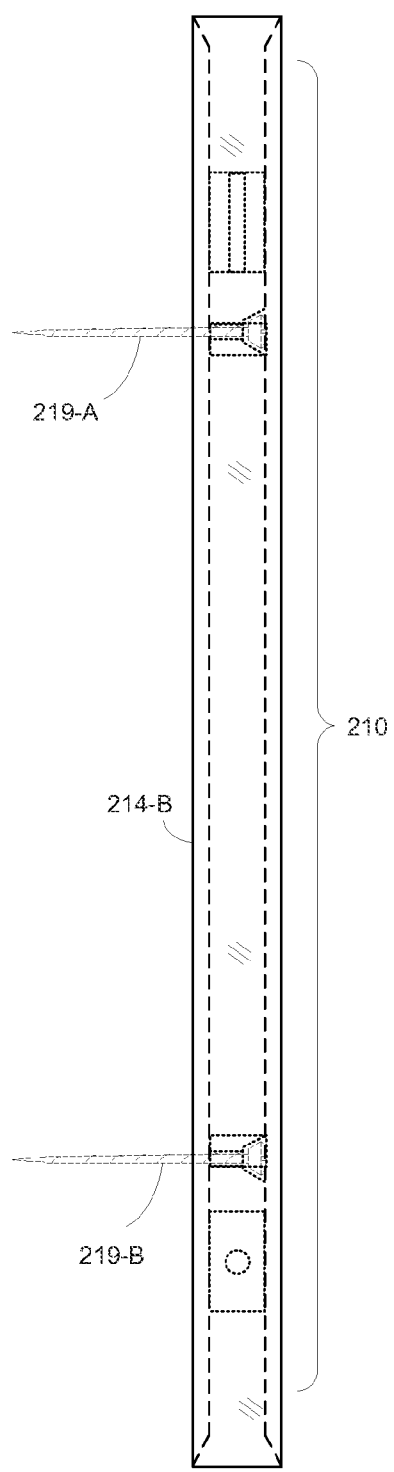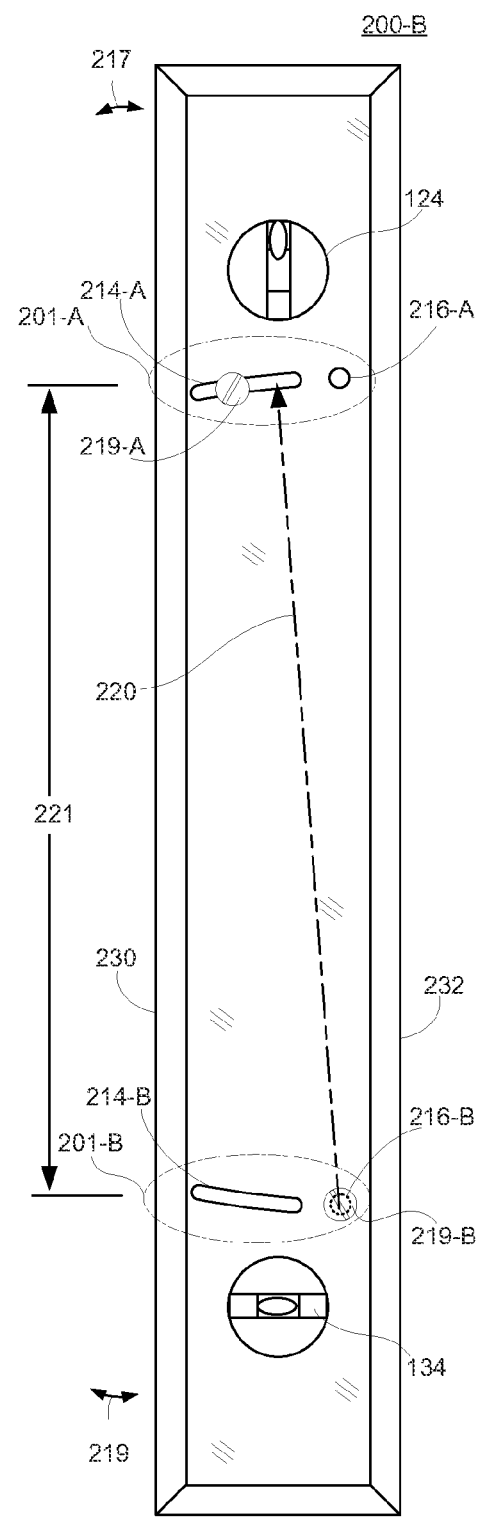
FIGURE 2B  FIGURE 2C

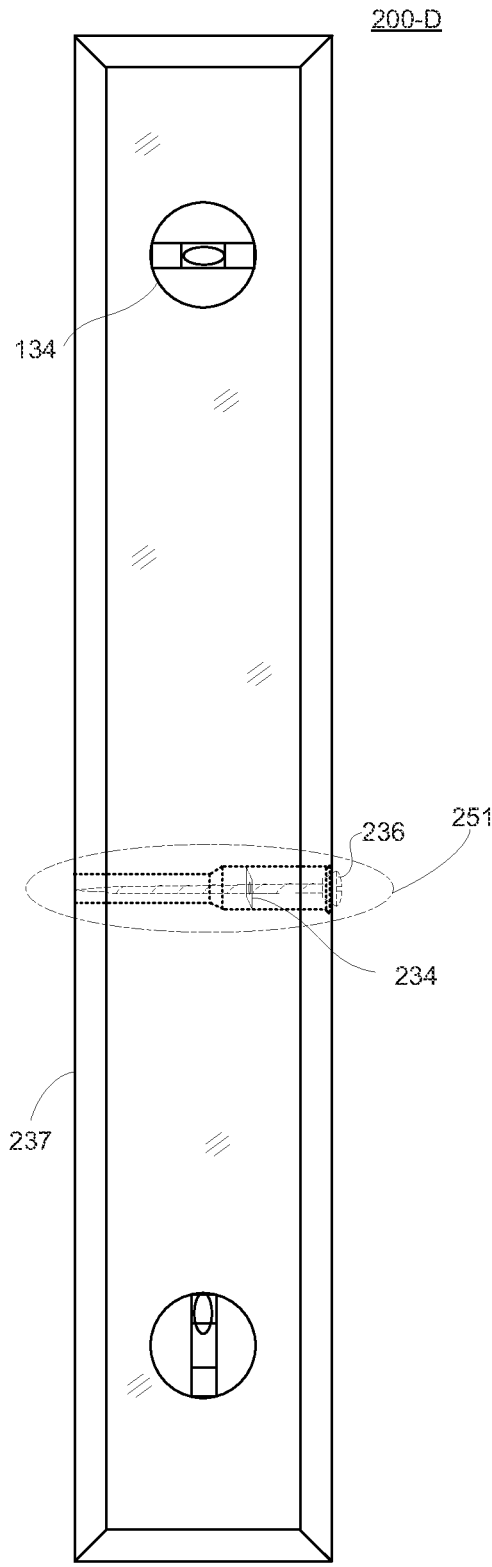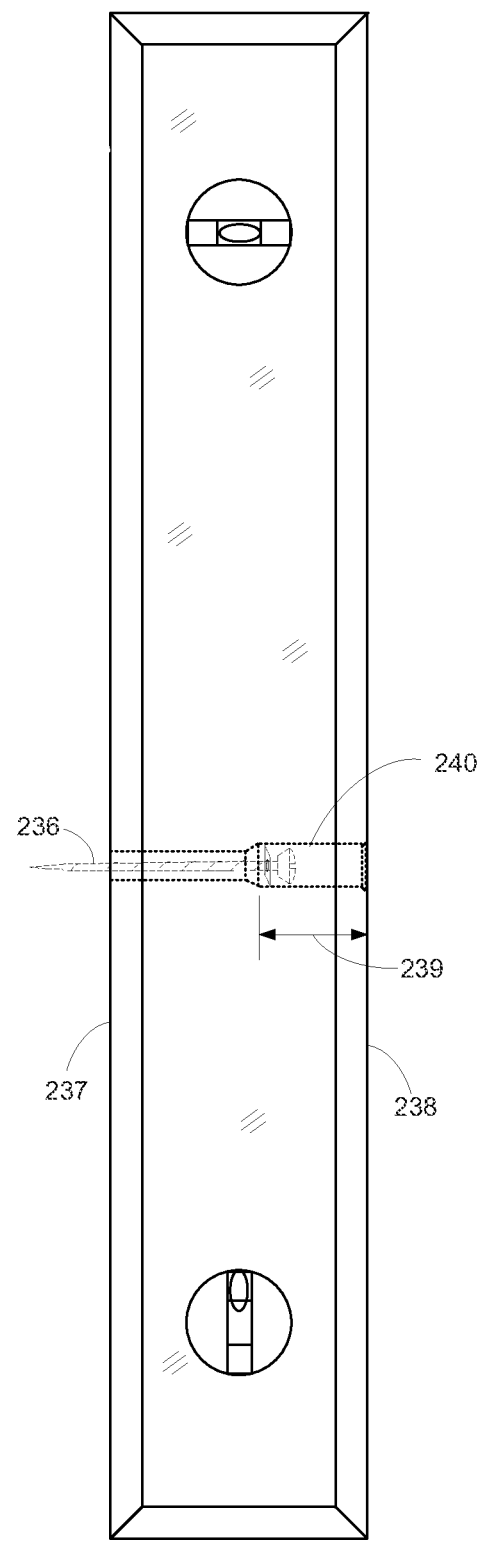
FIGURE 2D  FIGURE 2E

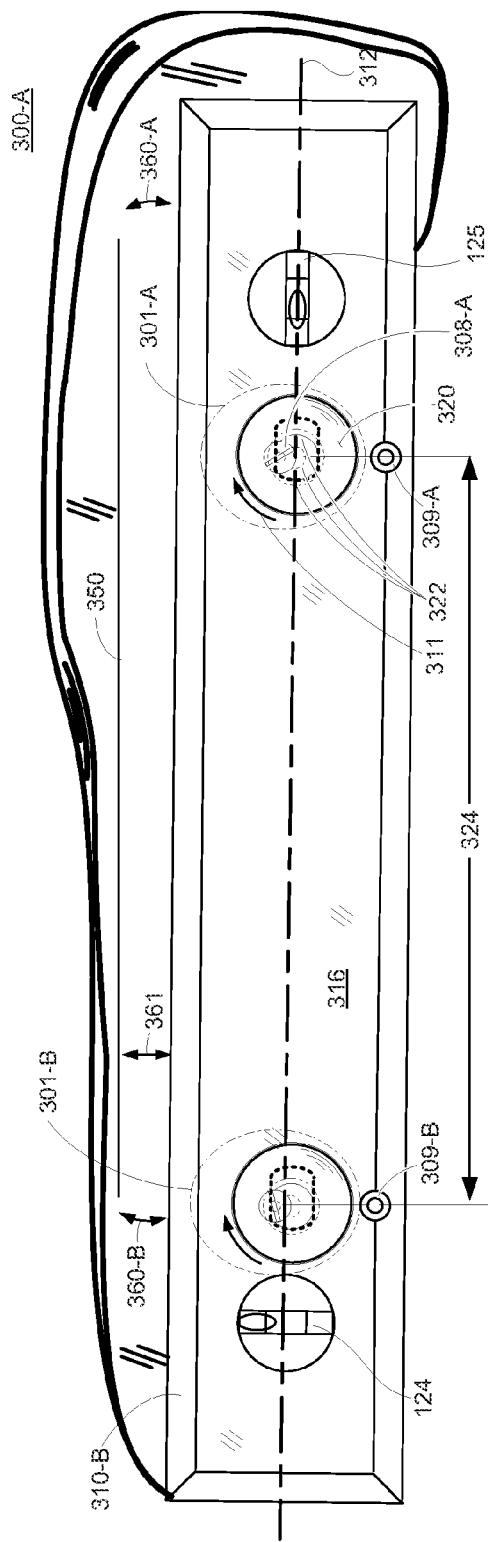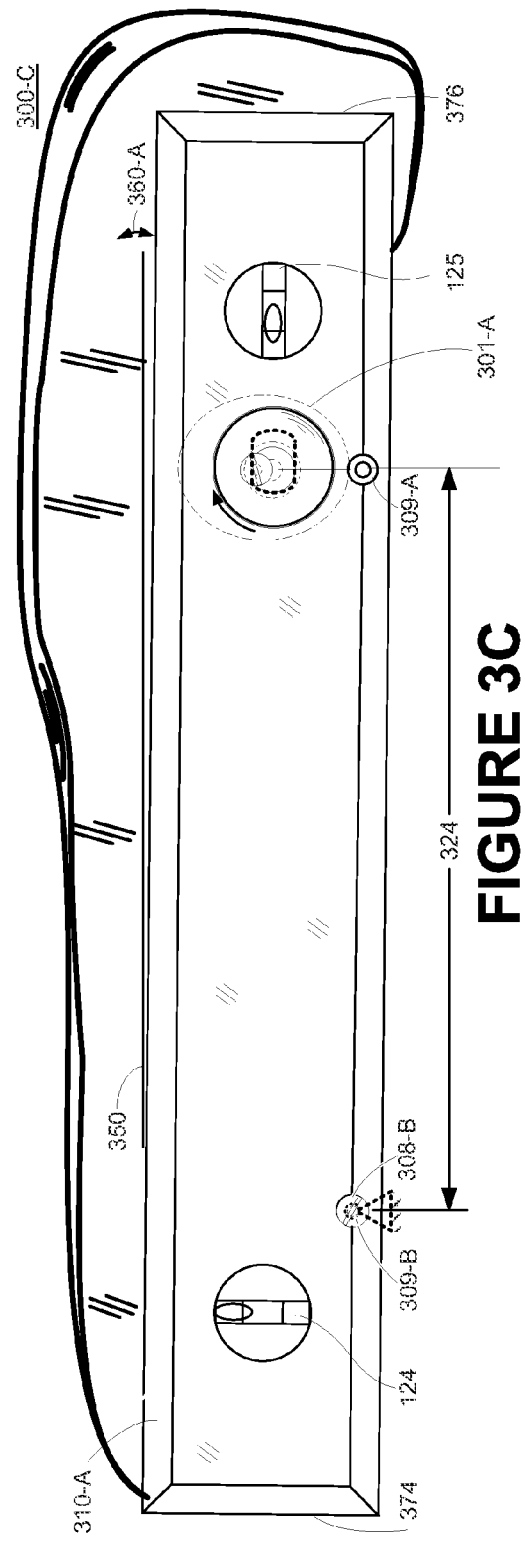

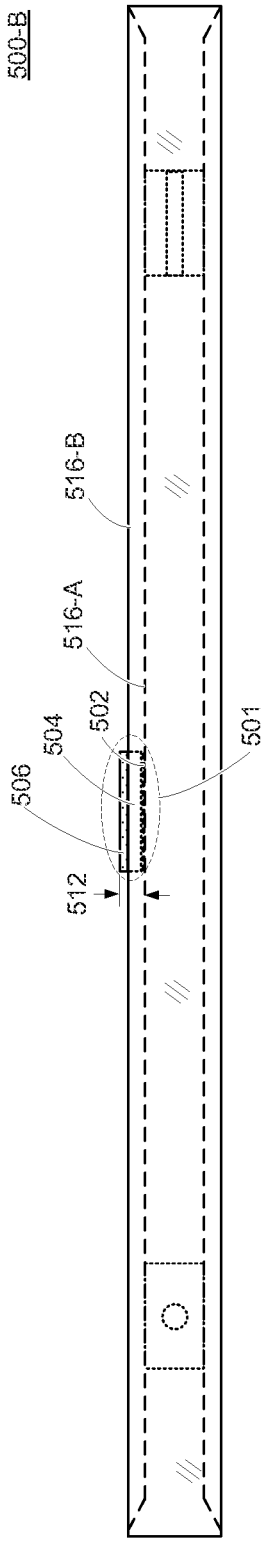
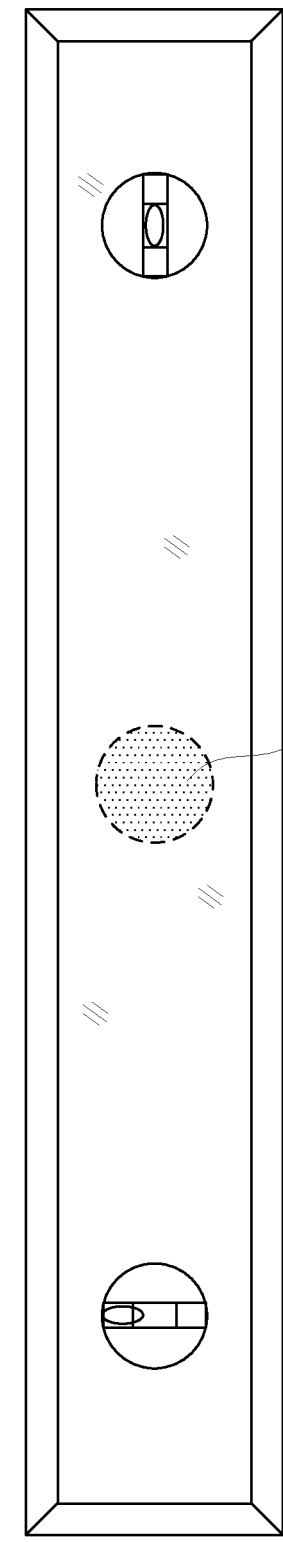
FIGURE 5B
FIGURE 5C

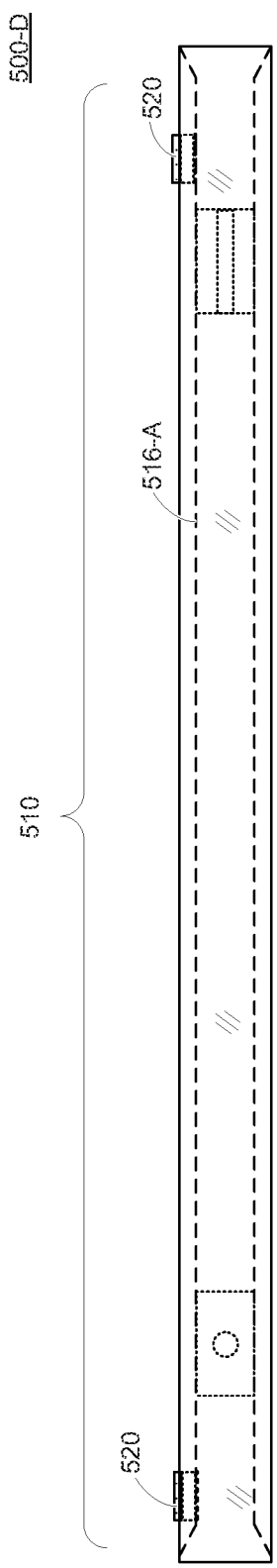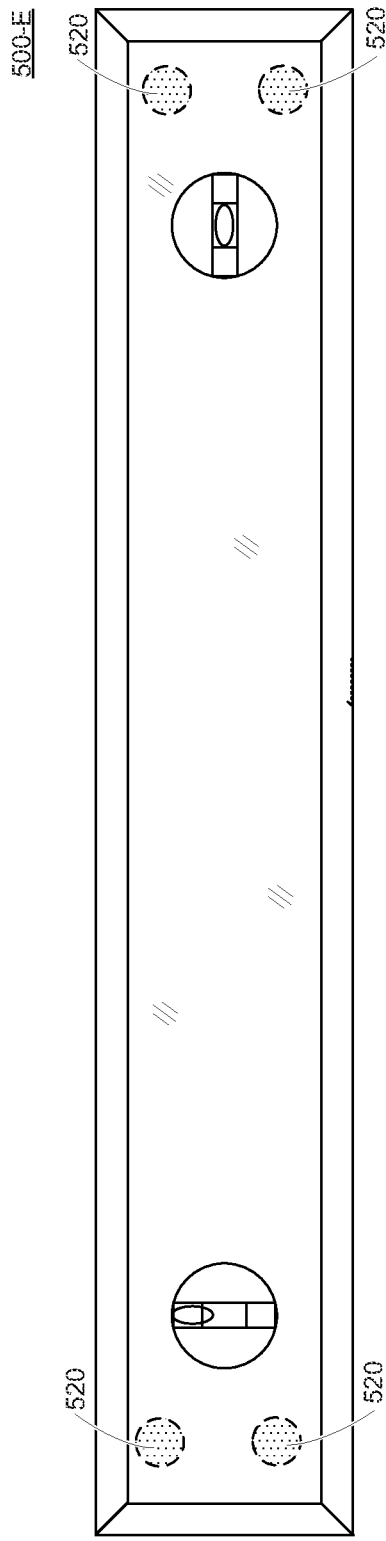
FIGURE 5D
FIGURE 5E

FIGURE 7B  FIGURE 7C

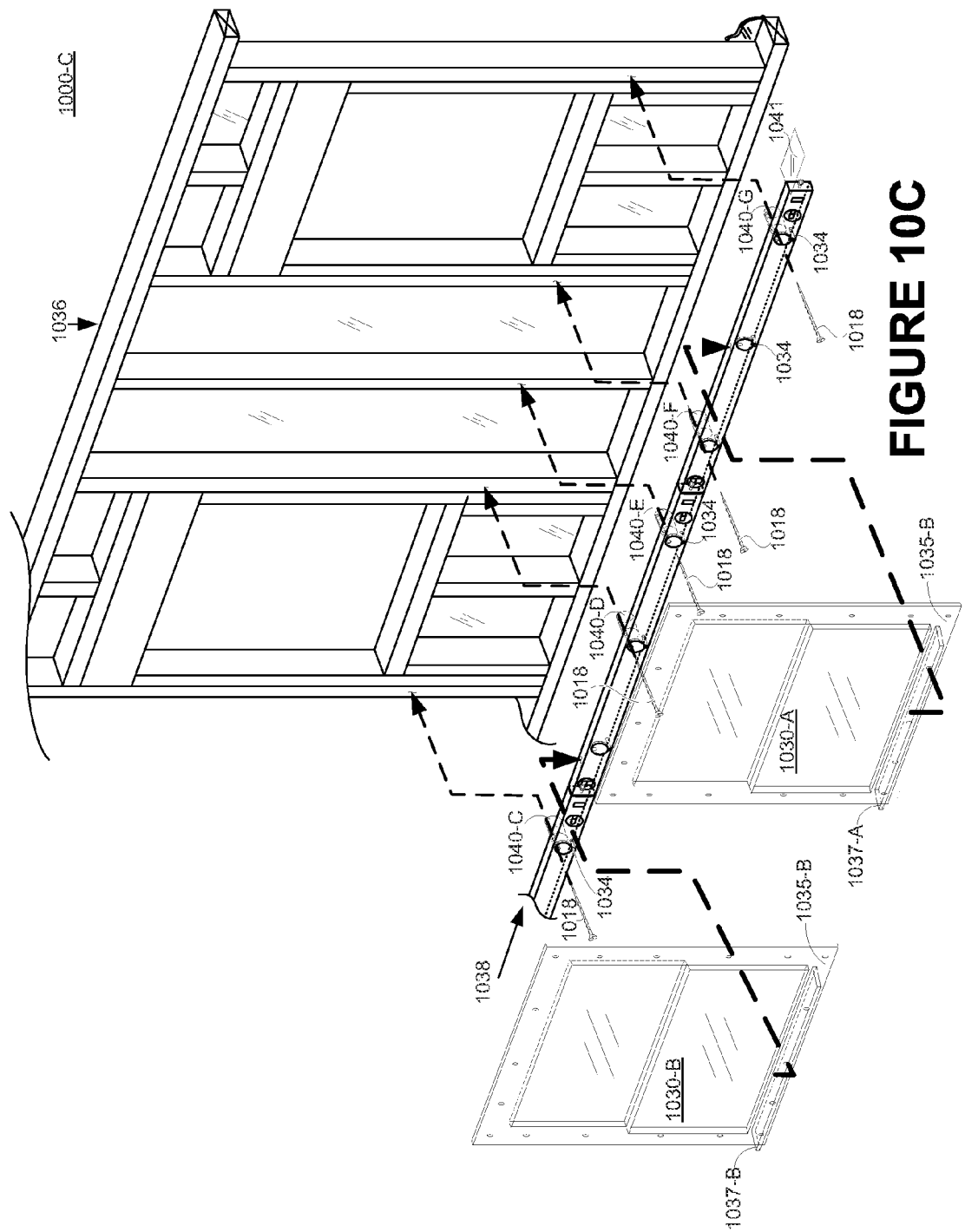

MULTI-FUNCTION LEVEL WITH A JOINABLE END

CROSS-REFERENCE TO RELATED APPLICATIONS

This application is a 35 U.S.C. §371 national phase application of PCT International Application No. PCT/US2011/068234, entitled "MULTI-FUNCTION LEVEL," having an international filing date of Dec. 30, 2011, claims priority to U.S. provisional application(s): Ser. No. 61/429,011 filed Dec. 31, 2010, entitled "MULTI-FUNCTION LEVEL" in the United States Patent and Trademark Office, the disclosures of which are incorporated by reference herein in their entireties. The above PCT International Application was published in the English language and has International Publication No. WO/2012/092611 A2.

FIELD OF THE INVENTION

The present disclosure relates generally to a marking or measuring device and more particularly to a multi-function level.

DESCRIPTION OF THE RELATED ART

Creating level and plumb lines or surfaces is ubiquitous in many aspects, from building and construction, to furniture, hanging pictures, installing fence posts, etc. In other cases, an offset, angle, or pitch, e.g., as dictated by code, is marked or measured from level or plumb in other areas of building and construction such as structures requiring water drainage, e.g., drains and sewage plumbing, roads and sidewalks, roofs, etc.

Different types of jobs and applications demand different configurations and sizes of levels, which are also known as a carpenter's levels, a bubble level, or a spirit level, so named for the fluid and bubble of air in the vial that provides a level or inclination reading, e.g., a horizontal or vertical plane. For many applications a nominal level of several feet or more in length is adequate and easily transportable. For other applications a longer level is more useful in order to have continuity of the level or plumb measurement over a longer span of an object or to provide a more accurate measurement of level or of plumb. However, a longer level is typically more cumbersome and more easily damaged.

A level can be held by hand against a work piece or an installation piece in order to make the level or plumb measurement. If an object is being measured to install it level or plumb, then the object and the level together are typically adjusted, e.g., by shimming a cabinet or nudging a picture until level, plumb, or the desired offset or pitch is achieved. Some applications need a level measurement of an installation piece against a work piece, e.g., installing a window in a wall of a house.

In some applications, such as installing level tile, the level is subjected to a messy or dirty environment where the level can be exposed and covered or contaminated with the work material, e.g., grout. Cleaning the level can be a burdensome and inefficient use of time, but still a necessary task for maintaining the accuracy and function of the tool.

SUMMARY OF THE INVENTION

The present disclosure of the invention provides a method and apparatus with several embodiments that overcome the limitations of, provide improvements to, and/or satisfy long felt but unsatisfied needs of the prior art. Beneficially, the present disclosure provides a multi-function tool that provides level and plumb measurements and marking.

In particular, the multi-function level includes modular ends that allow attachment of mating levels for linear extension in one direction.

A first embodiment of the present disclosure provides a level apparatus comprising a body having a longitudinal axis and having two side faces, a top and a bottom surface, and two end faces with each end face located at the end of the axis, wherein at least one end face is a jointed end; at least one level indicator coupled to, or disposed in, the body and visible on the at least one side face of the body and/or visible on at least the top or bottom surface; a connector, or a structure to receive another connector, disposed in the jointed end of the body such that the modular level can be coupled to an add-on tool or another modular level; and wherein the connector, or the structure to receive the connector, will place a load on the level in a direction collinear with the axis of the body. The structure to receive the (linear) connector is disposed in the end face, either side face or the top or bottom face of the body.

Alternative embodiments of the connector can: be releasable or retractable; have an adjustment to place a variable or preset load on the level, be a post having at least a partially threaded portion that can be turned to increase tension on the post; be comprised of a post having a first end and a second end, wherein the first end is anchored into the first level, and wherein the second end of the post is coupled to a folding lever having a cam pivot to provide tension on the post; a post wherein the first end of the post is an adjustable nut or a non-adjustable lug; and/or be an elastomeric strap that is removably or permanently coupled to the body of the level In one embodiment the connector has no threads and is of a fixed length, with a cam lever providing the necessary variation in length to provide a variable or fixed load on the connector to hold multiple levels together.

The level in one embodiment can include a winch coupled to the body; and a strap coupled to the winch, wherein the strap has a free end for insertion to another object, and wherein the winch is capable of placing a tension load on the strap, in order to allow the level to retain another level or an add-on tool. Alternative embodiments of the jointed end of the body of the level can: have at least one mating flat surface with an imaginary normal vector that is parallel with longitudinal axis 112 of body to allow mating levels to slide together in a direction perpendicular to longitudinal axis 112, e.g., sideways; have a plurality of mating flat surfaces, each with an imaginary normal vector that is coplanar with, or parallel with, longitudinal axis 112, wherein at least one of the plurality of mating flat surfaces forms an angle with respect to another one of the plurality of mating flat surfaces, or wherein the angle formed between the plurality of mating flat surfaces on the jointed end of the first level and on the jointed end of the second level is a 90 degree angle for square joints or some other angle for acute or obtuse joints; have the plurality of flat surfaces extend in a direction perpendicular to the two side faces of the level, so that levels with grooved end faces can slide together sideways; have at least one item from the group of: a male, or convex, conical shape, and a female, or concave, conical shape, wherein the female component is shaped to accept a male conical shape, thereby providing centering function; have one end face with one male conical shape and one female conical shape aligned on a longitudinal axis parallel to the side face; have a conical shape that has a blunt tip.

In other embodiments, the level apparatus has: at least one non-jointed end, e.g., a non-jointed end on one end face and a jointed end on the other end face; has jointed ends on both end faces; or has non-jointed ends on both end faces. A connector is included in the level apparatus for a capability to be combined with other levels or tools.

One embodiment of the present disclosure provides a level system includes: a plurality of levels, wherein each of the plurality of levels has a longitudinal axis along a length of the level and has at least one jointed end capable of being coupled; a connector for coupling at least two of the plurality of levels; and wherein the connector is selectively, or adjustably, loaded under tension in order pull the jointed ends of the at least two of the plurality of levels together in compression.

The plurality of levels in one embodiment include: a first level having a longitudinal axis and having at least one jointed end; a second level having a longitudinal axis and having at least one jointed end; wherein the jointed end of the first level is combinable to the jointed end of the second level such that the axis of the first level is collinear with the axis of the second level; and wherein coupling of the first level and the second level pulls the jointed end of the first level and the jointed end of the second level together.

Alternative embodiments of the plurality of levels include where: each of the plurality of levels has a first end and a second end that are jointed ends for coupling together in series to form continuous extensions in the level system;

The jointed end of the first level has a structure to house the connector and wherein a jointed end of the second level includes a receptacle to selectively accept a connector of at least one pin. In another embodiment, the jointed end of the first level and the jointed end of the second level have mating convex (male) and concave (female) components for providing alignment. The male component is a conical shape and wherein the female component is shaped to accept a conical shape, thereby providing centering, wherein the conical shape optionally has a blunt tip, e.g., flattened or rounded.

Alternative embodiments of the connector include: a selectively releasable connector to facilitate assembling and disassembly of the plurality of levels; a post having at least a partially threaded portion that can be turned to increase tension on the post; a post having a first end and a second end, wherein the first end is anchored into the first level, and wherein the second end of the post is coupled to a folding lever having a cam pivot to provide tension on the post; an elastomeric strap that is selectively or permanently coupled to the first level and the second level;

The jointed end of the first level and the joined end of the second level both have: at least one mating surfaces that can be flat and perpendicular to the axis of the first and second level; or a plurality of mating flat surfaces, with one or more of those surfaces being perpendicular to the axis of the first and second level, and wherein at least one of the plurality of mating surfaces forms an angle with respect to another one of the plurality of mating surfaces, wherein the angle formed between the plurality of mating surfaces on the jointed end of the first level and on the jointed end of the second level is a 90 degree angle. In another embodiment, the first level and the second level in the level system each have at least one non jointed end.

These and other advantages of the present disclosure will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate one embodiment of the present disclosure and, together with the description, serve to explain the principles of the invention. It should be understood that drawings referred to in this description are not drawn to scale unless specifically noted like references indicate similar elements.

FIGS. 1B and 1C are a top and front view, respectively, of a level with modular ends, with a single receiver coupling on one end face, according to one or more embodiments.

FIGS. 1X, 1Y and 1Z are side views and a front view, respectively, of a two modular level assembly coupled to form a framing square in a plane parallel with the side faces, with an optional offset alignment, for marking right angles and for measuring level and plumb simultaneously, according to one or more embodiments.

FIGS. 1AA and 1AB are a front and bottom view of an assembly of three modular levels coupled to form a drywall square in a plane parallel to the side faces of the modular squares, according to one or more embodiments.

FIGS. 1AC and 1AD are a top and front view of an assembly of three modular levels coupled to form a T-square in a plane parallel to the bottom faces of the modular levels, for measuring level in two perpendicular planes, according to one or more embodiments.

FIGS. 2B and 2C is a top and side view of a level having a side-face retention system only on the side face of the level for retaining the level to a work piece, according to one or more embodiments.

FIGS. 2D and 2E are two side views of a level having a top or bottom surface retention system in an unused recessed position and in an extended position for engaging a work piece, according to one or more embodiments.

FIGS. 5B and 5C are top and front views of a level with a slip-resistant system on a side face of the level, according to one or more embodiments.

FIGS. 5D and 5E are a top and front view of a level with an alternative layout of slip-resistant system on a side face of the level, according to one or more embodiments.

FIGS. 7B and 7C are a front and side view of a level with a protective cover, according to one or more embodiments.

FIG. 10C is an exploded view of modular levels configured as an elongated installation-plane level with spacer offsets and retention connectors for measuring level for installation of two windows in parallel on a same wall, according to one or more embodiments.

Other features of the present embodiments will be apparent from the accompanying drawings and from the detailed description that follows. Alpha letters I and O are intentionally omitted in alpha numeric figures to avoid ambiguity with the use of numerals one (1) and zero (0).

DETAILED DESCRIPTION OF THE INVENTION

Reference will now be made in detail to the preferred embodiments of the invention. Examples of the preferred embodiment are illustrated in the accompanying drawings. While the invention will be described in conjunction with the preferred embodiments, it is understood that the invention is not limited to these embodiments. Rather, the invention is intended to cover alternatives, modifications and equivalents, which may be included within the spirit and scope of the invention, as defined by the appended claims. Additionally, in the following detailed description of the present disclosure, numerous specific details are set forth in order to provide a thorough understanding of embodiments of the present invention. However, it will be apparent to one of ordinary skill in the art that the present invention may be practiced without these specific details. In other instances, well-known methods, procedures, components, and operations have not been described in detail so as not to unnecessarily obscure aspects of the present invention.

Modular Level

Figure 1A:
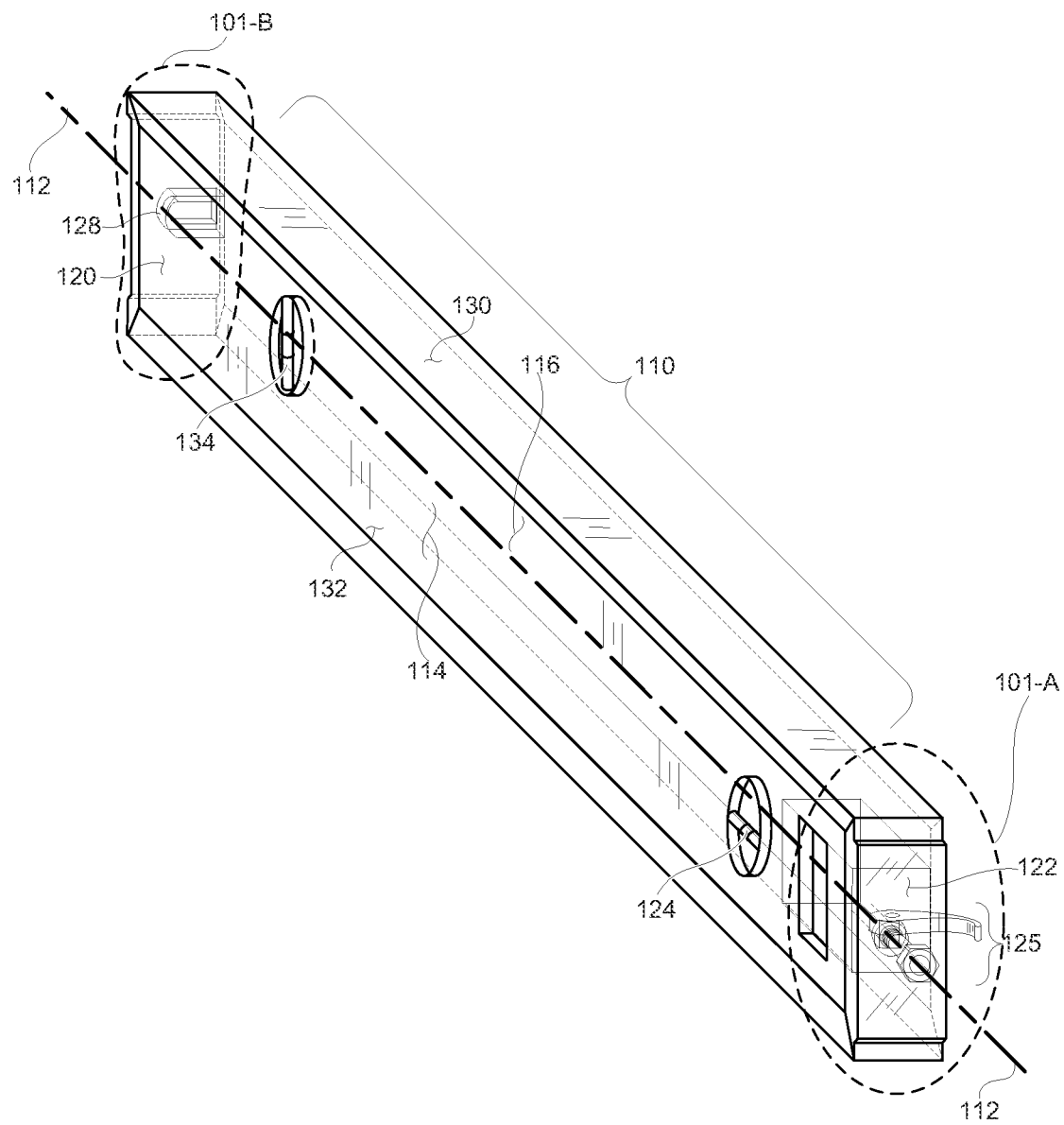
FIG. 1A is an isometric view of a modular level with modular ends, with a single receiver coupling on one end face, according to one or more embodiments.
Figure 1E:
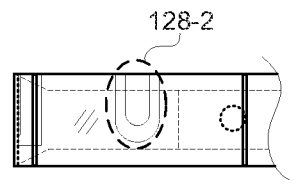
FIGS. 1D, 1E, 1F, and 1G are a side, top, front, and bottom view of a level with a modular end having two receiver coupling locations with one coupling location on the end face and one on the bottom surface, according to one or more embodiments.
Figure 1D:
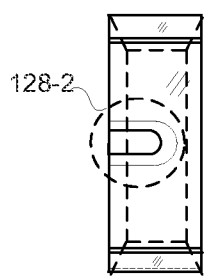
Figure 1F:
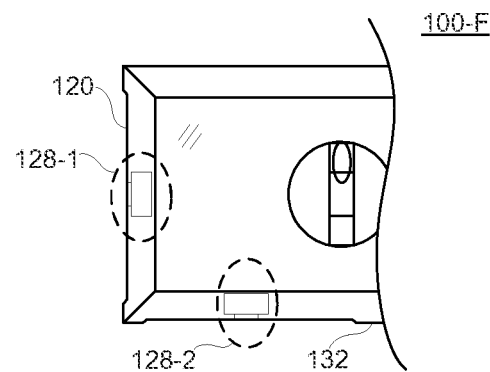
Figure 1G:
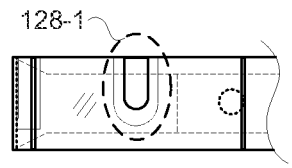
Figure 1H:
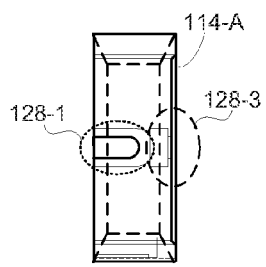
FIGS. 1H, 1J, 1K, and 1L are a side, top, front, and bottom view of a level with a modular end having three coupling locations with one coupling location on the end face, one on the bottom surface, and one on the side face, according to one or more embodiments.
Figure 1J:
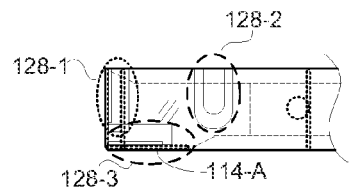
Figure 1K:
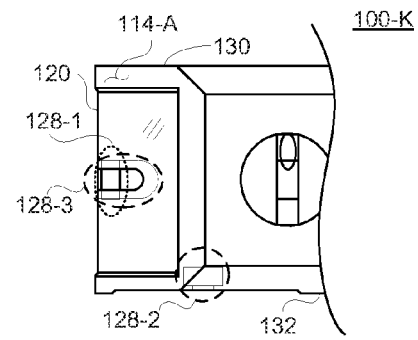
Figure 1L:
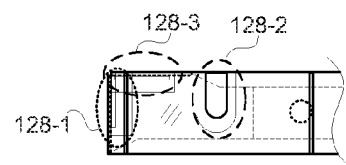

Referring now to FIG. 1A, a isometric view of a modular level 100-A with modular ends 101-A and 101-B having a single receiver coupling 125 on one end face 122, is shown according to one or more embodiments. In particular, modular level 100-A has a body 110 having a longitudinal axis 112 running along the longest dimension of the level, and having two side faces 114, 116, a top surface 130 and a bottom surface 132, and two end faces 120 and 122 each of which are located at the end of axis 112. Additionally, modular level 100-A includes: at least one end face 120 or 122 that is a jointed end or has a joint or joint structure; at least one level indicator 124 coupled to, or disposed in, the body and visible on the at least one side face 114 or 116 of the body and/or visible on at least the top or bottom surface 130 or 132; a connector 125, disposed in the jointed end, or modular end, 101-A of body 110, and/or a single receiver coupling, or structure, 128 disposed in the jointed end, or modular end, 101-B of body 110 to receive connector 125, such that the modular level 100-A can be coupled to an add-on tool (not shown) or another modular level. Connector 125, or the structure 128 to receive the connector, will place a resultant composite load on level 101-A in a direction parallel to, and optionally collinear with, the axis 112. That is, connector 125 and structure 128 to receive connector can be located on the centrally-located axis 112 of the body 110, or can be located offset, but parallel to, axis 112. Structure 128 to receive connector 125 is disposed in the end face 120 in the present embodiment, but may be disposed in either side face 114 or 116, or in either the top surface 130 or bottom surface 132 of body 110 in alternative embodiments. Connector 125, when not in use, is retracted or stowed in the body, or in some cases can be removed from the body, such that the level is useful as a single modular level itself, without members or joining mechanisms that would otherwise protrude and might interfere with a basic leveling function, or level transport and storage. Modular level 100-A can have only one end face, or both end faces, 120 or 122 with a jointed configuration. Body 110 of level 100-A, apart from the end face, e.g., the main length of level 100, will have no load from coupling level 100-A to another level or add-on tool, thus reducing any potentially warping affect on the body or faces, especially top and bottom faces 130 and 132, of level 100-A, and thereby ensuring a more accurate level performance and measurement. By having a load on level 101-A in a direction parallel to, and optionally collinear with, the axis, the alignment of multiple levels coupled together is collinear, and thus level and measuring functions are more accurate and useful. This is superior over an alternative embodiment that loads multiple collinearly assembled levels in a direction perpendicular to the axis of the body of the levels and thus may misalign the levels, especially if the load pushes any part of the body of the levels apart from each other. Thus, the present embodiment does not require an additional rail or other long or bulky equipment in which multiple levels would be inserted, or set, in order to retain them together as a long level assembly.

Level indicator 124 has a vial axis parallel with axis 112 of level 101-A for measuring a level position, while optional plumb indicator 134 has a vial axis perpendicular to axis 112, or perpendicular to and optionally offset from axis 112, for measuring a plumb position. Level 101-A can include additional vials, e.g., indicating a 45° angle, and/or a rotatable vial capable of variable angles. Any of the vials can be visible on any faces desired, e.g., on top surface 130 and both side faces 114 and 116 by designing the vial near the top surface with scallop cuts to allow viewing of the vial, and with clear plastic portions of body or vial housing that are optionally flush with top surface 130 and both side faces 114 and 116.

Referring now to FIGS. 1B and 1C, a top and front view, respectively, of modular level 100-A with modular end faces, is shown according to one or more embodiments. Connector 125 is releasable and retractable, and has an adjustment to place a variable, adjustable, or preset load on the level 100-A. In particular, connector 125 includes a post 126 having a first end 127 and a second end 123 having at least a partially threaded portion, e.g., to accept a nut 140, which can be turned to vary, e.g., increase or decrease, the tension, on the connector post 126. First end 127 is anchored into a first level, e.g., modular level 100-A, by coupling it to a folding lever 136 having a cam pivot 137, shown in a relaxed, or open, state, to provide tension on the post when folding lever 136 is depressed. Second end 123 of connector post 126 is capable of being anchored into a second level (not shown) having a structure 128 to receive connector 125. In particular, body 110 is a structure with a large cavity 129 formed to receive a nut 140, and a structure with a narrower slot 131 to receive the post 126 but enclose the nut 140, thereby effectively retaining connector 125, and allowing a plurality of modular levels to be coupled together. In lieu of nut 14, a non-threaded lug, e.g., cylindrical, square, or other shape may be coupled to, or integral with post 126 for use in retaining an adjoining modular level.

While the present embodiment has jointed ends on both end faces 120 and 122, other embodiments have a jointed end only on one end face, and a non jointed end on the other end face, thus providing for only one additional modular level to be added to it, though other modular levels may be added to the additional modular level.

At least one mating flat surface 120 on jointed end, e.g., 101-A and 101-B, has an imaginary normal vector that would be coplanar or collinear with axis 112 in the present embodiment, in order to allow mating levels to slide together in a direction perpendicular to axis 112, e.g., sideways. Level 100-A also has a plurality of mating flat surfaces 120-1, 120-2, 122-1, and 122-2 whose imaginary normal vector would be coplanar with axis 112, wherein at least one of the plurality of mating flat surfaces, e.g., 120-1 and 122-2, forms an angle with respect to another one of the plurality of mating flat surfaces, e.g., 120 and 122, respectively, or wherein the angle formed between the plurality of mating flat surfaces on the jointed end of the first level and on the jointed end of the second level is a 90 degree angle. In other words, the plurality of flat surfaces 120, 120-1, 120-2, 122, 122-1, and 122-2 extend in a direction perpendicular to the two side faces of the level in the current embodiment. Modular ends 101-A and 100-B have multiple faces, with offsets and angles of intersection in order to make a stepped joint that will provide faces against which two mating modular levels will not rotate, thus providing rotational stability, and consequently alignment of top and bottom surfaces across mating modular levels, to provide smooth and contiguous level or plumb measurements or lines on a work piece or an installation piece. Mating flat surface 120-1 makes an approximate 45 degree angle with respect to other mating flat surfaces 120-2 and 120, thereby providing a guiding feature for the mating flat surfaces, e.g., 122-1 from another adjoining modular level. An alternative embodiment to mating flat surfaces would be the use of mating saw tooth surfaces or mating curved surfaces, e.g., conical, cylindrical, wedge shape, or combination thereof in any axis that would provide alignment and stability of the assembled mating levels or add-on tools. In these embodiments, while individual loading vectors perpendicular to mating faces may not be collinear or parallel to the axis of the body of the level, the resultant composite load will result in a composite loading vector that is coplanar, collinear, or parallel to the axis of the body, e.g., two angled vectors cancel their opposite direction components and combine in the similar direction components. Other embodiments can be used without a composite loading vector that is coplanar, collinear, or parallel to the axis of the body, but the coupling between the levels may not be as beneficial.

The load on connector 125 is a tensile, or tension, load. The complementary and opposing load on a mating end face, similar to 120, of another level or add-on tool with a structure, similar to 128, to receive connector 125 is a compressive, or compression, load. A substantial portion of body 110 receives no load from coupling the level to another level. This promotes several benefits such as: a substantially unloaded level, thereby avoiding warping or buckling, while maintaining flatness, consistency, accuracy of top surface 130, bottom surface 132, and side surfaces 114 and 116, as well as edges 116-B and 114-B (where two planes intersect). A variable, or adjustable, load on a connector can be used when multiple joined levels, or add-on tools, create a very long assembly, which requires a strong load to provide rigidity and stability in the assembly, and thus reduce bending or distortion. In another embodiment, a connector traverses the entire length of the level, thus placing the entire level in compression, and reducing bending from very long assemblies, or from excessive loads placed on level for an installation. In another embodiment, multiple connectors 125 with multiple mating receiver couplings, or structures 128 can be used on ends 120 and 122, e.g., analogous to the pins 166 and 168 of FIG. 1R hereinafter. By using multiple connectors, located closer to the top surface 130 and the bottom surface, bending strength of the joint is significantly improved, thus offering improved rigidity for longer assemblies of multiple levels, and for bearing the load of work pieces. In yet another embodiment, mating faces 122 through 122-2 and 120-120-2 can represent more of a dovetail arrangement, with multiple tongue in groove instances, thus allowing multiple mating levels to slide together sideways to form an integral joint with a tight fit or a moderate press fit that provides alignment, as well as bending strength, with an optional built in single or multiple connector and receiver coupling if desired.

Referring now to FIGS. 1D, 1E, 1F, and 1G a side, top, front, and bottom view of a level 100-F with a modular end having two (2) coupling structures, or locations, with one coupling 128-1 located on the end face 120 and a second coupling 128-2 located on the bottom surface 132, is shown according to one or more embodiments. These modular ends are the female version of the coupling, e.g., a structure to receive connector. Having multiple coupling locations on a given modular level provides more configurability options to adjoining modular levels or add-on tools, in multiple Cartesian axes, e.g., 2 axes, as will be described in subsequent figures applying modular level assemblies to work projects. In the present embodiment, a modular end 101-A of level 100-F only has a single connector (not shown), similar to that of modular level 100-A.

Referring now to FIGS. 1H, 1J, 1K, and 1L a side, top, front, and bottom view of a level 100-F with a modular end having three (3) coupling structures, or locations, with one coupling 128-1 located on the end face, a second coupling 128-2 on the bottom surface 132, and a third coupling 128-3 located on the side face 114-A, which has a flat surface extending from top surface 130 to bottom surface 132, is shown according to one or more embodiments. These modular ends are the female version of the coupling, e.g., a structure to receive connector. Having multiple coupling locations on a given modular level on multiple orthogonal planes, or axes, provides more configurability options to adjoining modular levels or add-on tools, e.g., in three Cartesian axes for the present embodiment, as will be described in subsequent figures applying modular level assemblies to work projects. In the present embodiment, level 100-F will only have a single connector (not shown), similar to modular end 101-A of modular level 100-A. Coupling structures can be provided in any quantity of any combination of any of top, bottom, first side, second side and end faces, or surfaces.

Figure 1M:
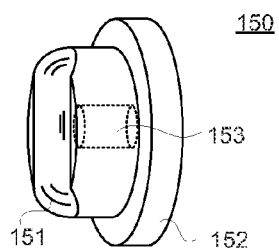
FIG. 1M is an isometric view of a washer seat for a cam-operated connector post to hold two modular levels together as a unit, according to one or more embodiments.

Referring now to FIG. 1M an isometric view of a washer seat assembly 150 for a cam-operated connector post to hold two modular levels together as a unit, is shown according to one or more embodiments. In particular, washer seat assembly 150 includes: a wide base 152 to dissipate the load of a connector when placed inside cavity 147 formed in body 110; a structure forming a hole cavity 153 to accept a connector; and a cylindrical shaped seat 151 to accept and center cam 137; wherein these features work in concert to enable one level embedding one end of a connector to pull together a mating level with a structure to accept the other end of the connector.

Figure 1N:
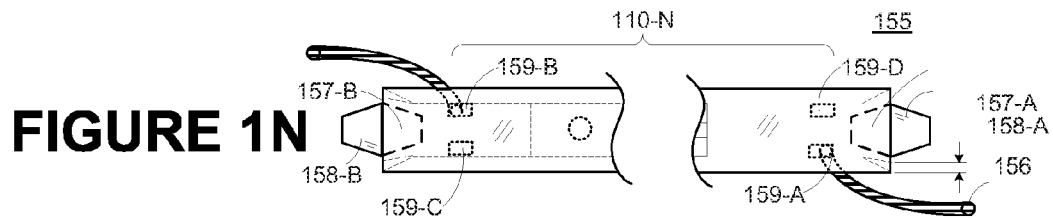
FIGS. 1N and 1P are a top and front view of a level with alignment cones and elastomeric retention straps to pull two mating modular levels together, according to one or more embodiments.
Figure 1P:
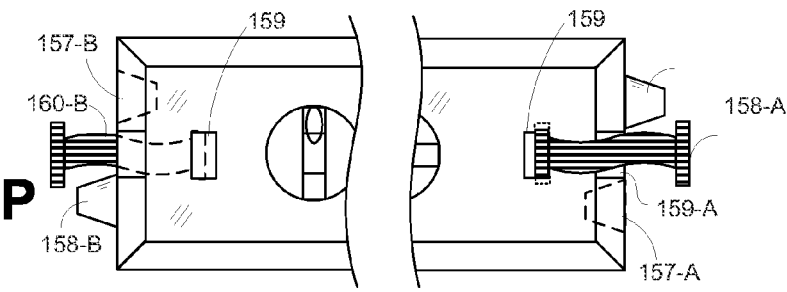

The embodiments in FIGS. 1N, 1P, 1Q, 1R, 1S, and 1T illustrate modular ends that mate together as disclosed for FIGS. 1A through 1L. Referring now to FIGS. 1N and 1P a top and front view of a level 155 having: alignment cones 158-A and 158-B; corresponding structures that form conical cavities 157-A and 157-B; elastomeric retention straps 160-A and 160-B; and cavities 159-A/159-B and cavities 159-C/159-D formed in body 110-N to receive elastomeric retention straps 160-A and 160-B of given level 155, and to receive elastomeric retention straps (not shown) of mating levels (not shown), respectively. Level 155 provides attachment, retention, and loading means via elastomeric retention straps 160-A through 160-D to pull two or more mating modular levels together. One end of an elastomeric strap can be removably or permanently coupled to the body 110-N of level 155, while a removable end will be removably coupled from a mating level. A tab can be built into the elastomeric strap to facilitate coupling with a mating level, into a cavity that is located a distance greater than the length of the elastomeric strap in order to stretch the strap and place it in tension. In other embodiments, elastic bands or metallic springs may be used to retain multiple levels together. The mating nature of the cavities 159-A and 159-B and cones 158-A and 158-B provide alignment of top surfaces, and prevent rotation of one level to another mated level.

Level can include different arrangements and quantities, e.g., one or more, of: a male, or convex, conical shape, and a female, or concave, conical shape, wherein the female component is shaped to accept a male conical shape, thereby providing centering function; have one end face with one male conical shape and one female conical shape aligned on a longitudinal axis parallel to the side face; have a conical shape that has a blunt tip, e.g., frustoconical. One advantage to the alignment of multiple levels, whether by flat mating surfaces, grooved surfaces, multiple faces, or a frustoconical configuration, is the torsional rigidity about the body axis and the stability provided, thus ensuring a flat and coplanar top face and/or bottom face of one or more levels, which in turn ensures an accurate level measurement on a work piece.

Figure 1Q:
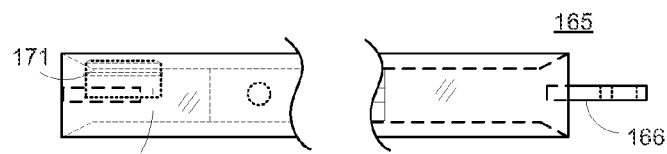
FIGS. 1Q and 1R are a top and front view of a level with alignment pins and a retention notch and dial system to pull two mating modular levels together, according to one or more embodiments.
Figure 1R:
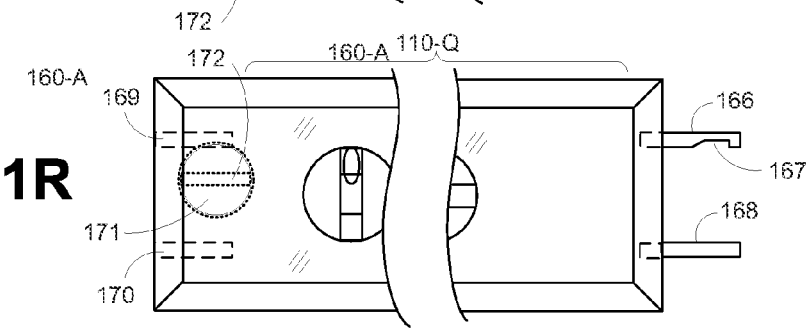

Referring now to FIGS. 1Q and 1R a top and front view of a level 165 with a alignment pins 166, 168 and a holes 169, 170 and dial system 171 to pull two mating modular levels together, is shown according to one or more embodiments. In particular pins 166, 168 of one level will fit into holes similar to 169, 170 of a mating level (not shown), via a slip fit or a slight friction fit. Pin 166 includes notch 167 into which a flat tang, similar to 172 of dial 171, can be engaged by turning dial 171 from a mating level (not shown). Dial can have a rotatable friction fit in body 110-Q of level, or can be screw threaded into body 110-Q in order to maintain its position when turned into a notch 167 of pin 166.

Figure 1S:
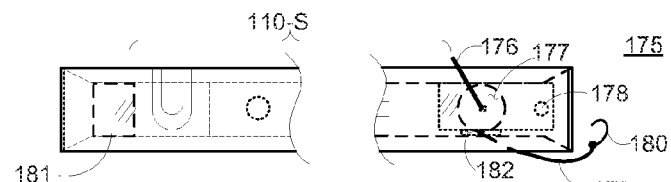
FIGS. 1S and 1T are a top and front view of a level with a strap, winch, and post retention system to pull two mating modular levels together, according to one or more embodiments.
Figure 1T:
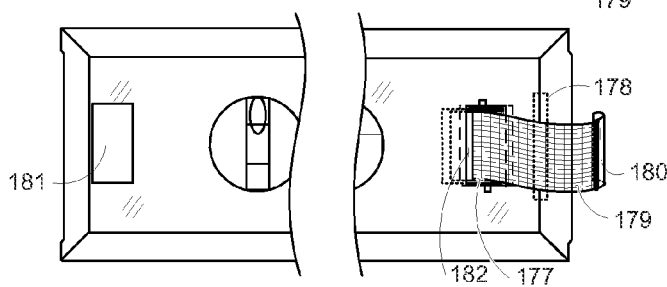

Referring now to FIGS. 1S and 1T a top and front view of a level 175 with a strap 179, winch 177, and post 178 retention system to pull two mating modular levels together, is shown according to one or more embodiments. In particular, strap 179 is coupled and wound around winch 177, which is rotatably coupled to body 110-S. Strap 179 protrudes from window 182 formed in body 110-S to allow a free end of strap 179 to be placed through a slot, similar to slot 181, in another object, e.g., a mating level or tool (not shown), and then coupled via hook 180 onto post 178 of the same level 175 to retain another object and allow a variable tension load to be placed on the strap 179 via winch handle 176. A dog pawl ratchet with release, known by those skilled in the art, allows for release of strap 179. When not in use, hook 180 can be placed on post 178 and tightened without any mating level.

Figure 1U:
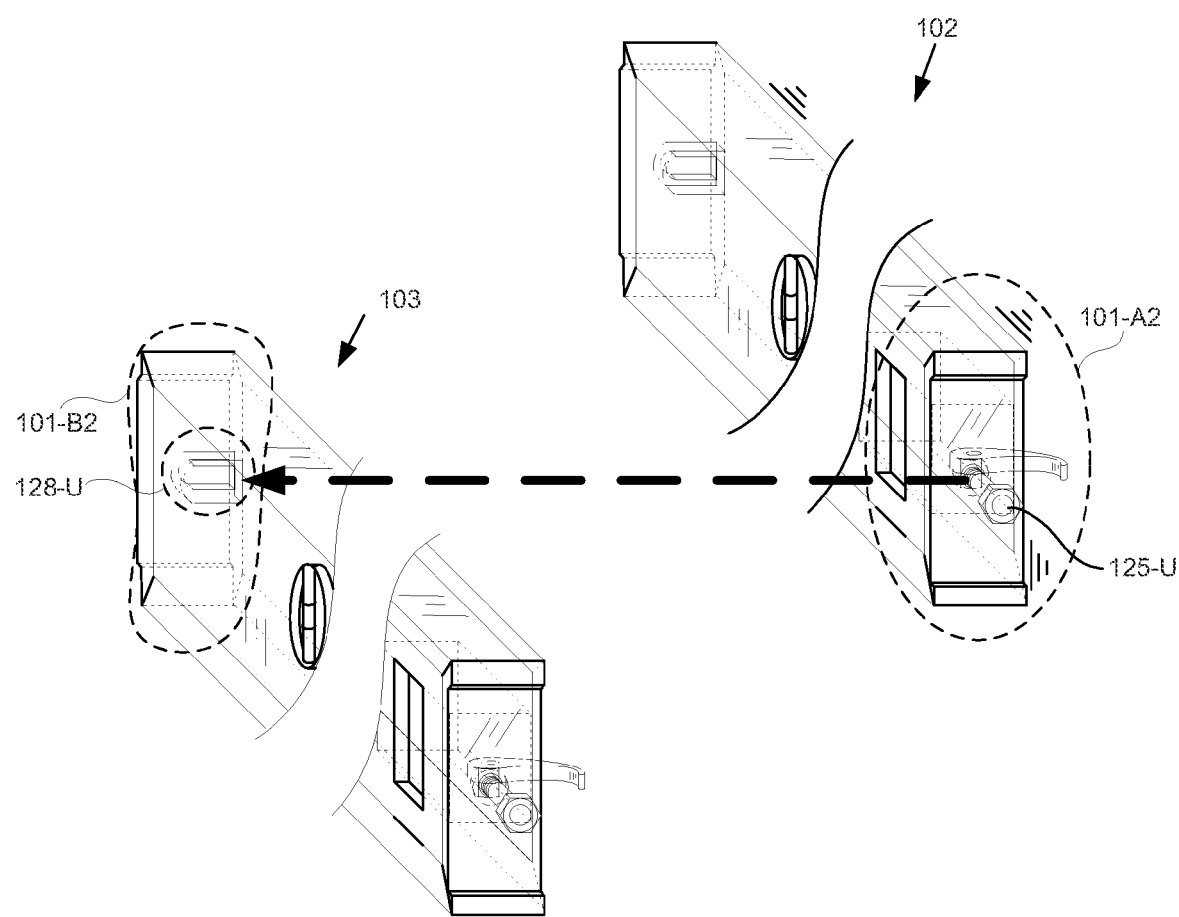
FIG. 1U is an isometric view of two modular levels being aligned for being coupling together as a single level system, according to one or more embodiments.

Referring now to FIG. 1U an isometric view of two modular levels 102, 103 being aligned for being coupling together as a single level system 100-U, is shown according to one or more embodiments. In particular, modular end 101-A2 of level 102 slides in a direction perpendicular to side faces of both levels in order to engage connector 125-U into structure 128-U for accepting connector. Once mated, and aligned so top and bottom face, or surfaces, of both levels 102, 103 align and are flush, and optionally such that that side faces of both levels align and are flush, then lever 136 can be pushed to engage cam 137, which tightens connector 125 and locks both levels 102, 103 together to act as a single contiguous level with flush top and bottom surfaces. The jointed end of the first level pulls the jointed end of the second level toward itself collinearly.

Figure 1V:
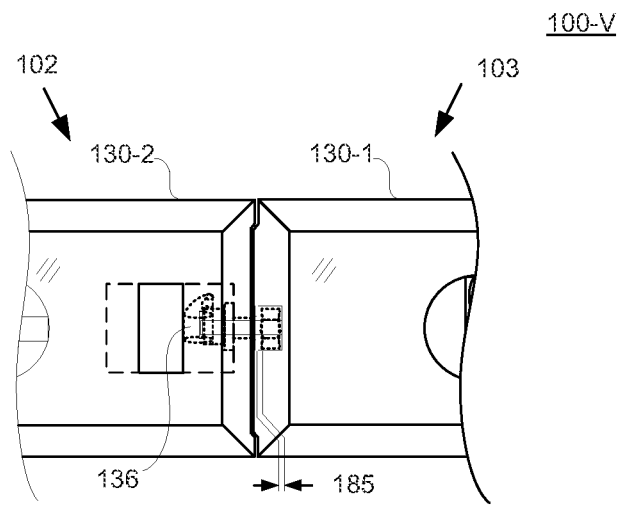
FIGS. 1V and 1W are side views of an assembly of two modular levels coupled together on their end faces, with a retention post in a loose and a tight position, respectively, according to one or more embodiments.
Figure 1W:
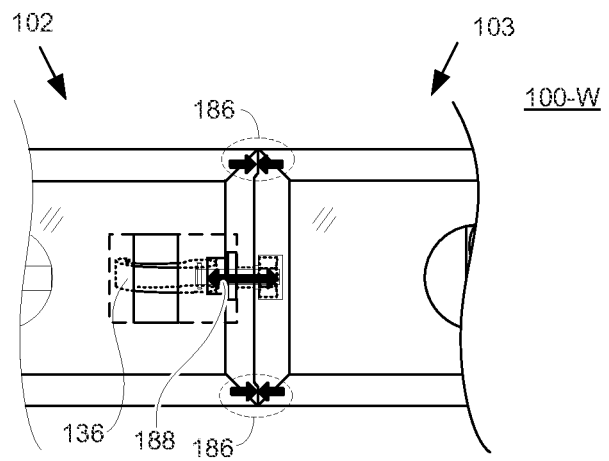
Figure 1A:
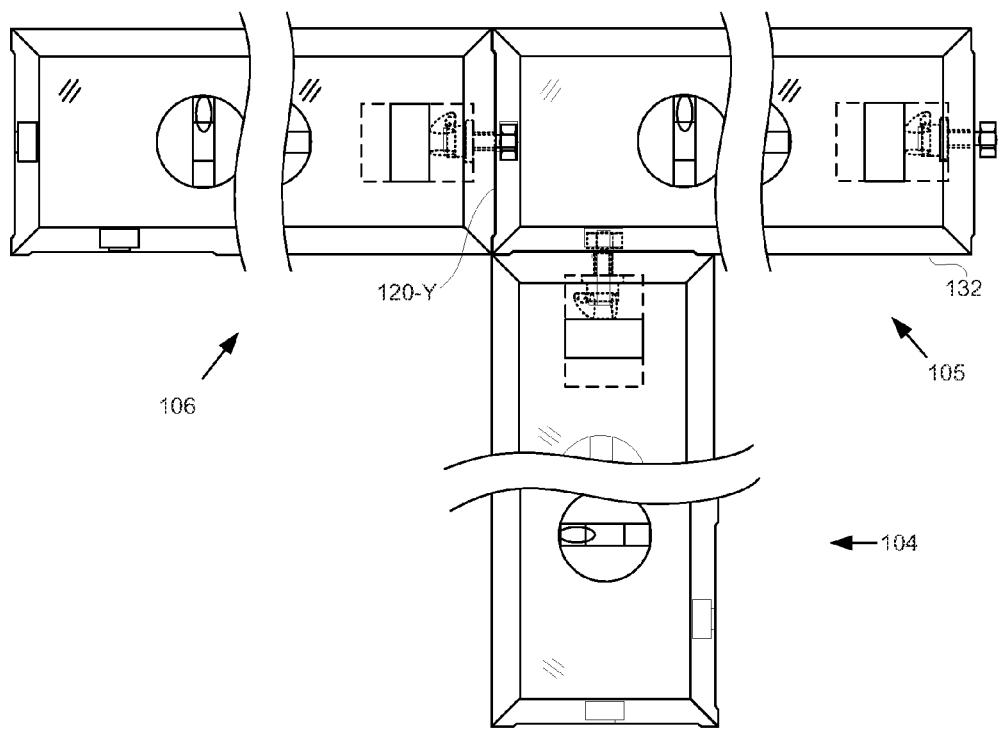
Figure 1A:
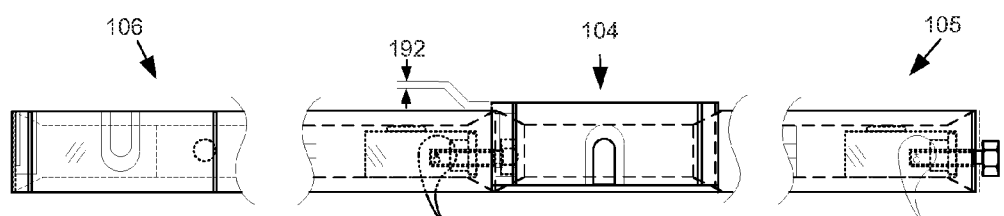
Figure 1A:
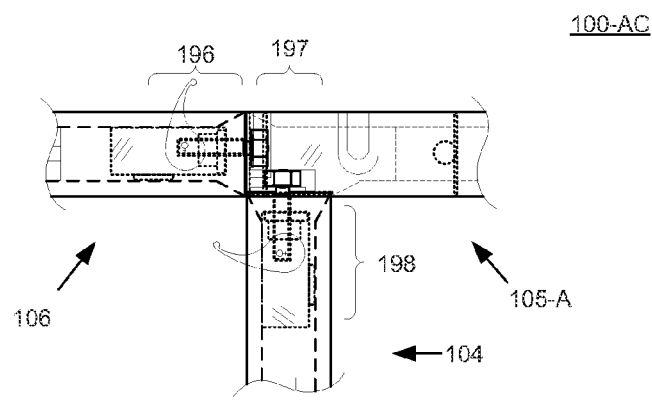
Figure 1A:
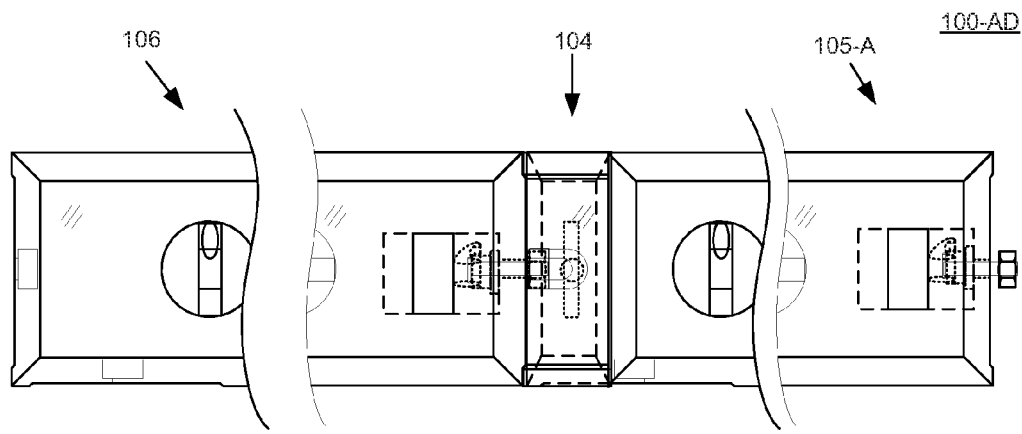

Referring now to FIGS. 1V and 1W side views of an assembly 100-V of two modular levels 102 and 103 coupled together on their end faces, with a connector in a loose and a tight position, respectively, are shown according to one or more embodiments. In particular, levels 102 and 103 are slid together with top surfaces 130-2 and 130-1 flush, and with lever 136 in a turned down position to allow slack 185 between connector 125 and structure 128 to accept connector. In FIG. 1W, lever 136 is pushed into an inline and tight position, eliminating any effective gap between levels 102, 103 and drawing connector 125 in tension per arrows 188, while creating compression on end faces of levels 102, 103, per arrows 186.

Referring now to FIGS. 1X, 1Y and 1Z side views and a front view, respectively, of a two modular level assembly 100-Z coupled to form a framing square or a try-square, in an L-shape, are shown according to one or more embodiments. In particular, FIG. 1Z illustrates end face 120-Z of level 104 is coupled to bottom surface 132-Z of level 105 such that side faces of both levels are coplanar or are in parallel planes. In particular, FIG. 1X illustrates a side face 114-X of level 105 has an offset 190-B from side face 114-Y of level 104, thereby allowing level 105 to act as a try-square, falling along the edge of a work piece to try the squareness of an adjoining surface. Offset 190-B is created by tightening connector 125 when level 104 and 105 are in an offset position, e.g., with a side face of one level in a plane parallel with the side face of the other level. The plurality of stepped surfaces 120, 120-1, and 120-2 allow levels 104 and 105 to slide together while preventing rotation, anywhere from an offset position to a flush position, as desired by the user. In contrast, FIG. 1Y illustrates side face 114-X of level 105 flush to side face 114-Y of level 104, thereby acting as a framing square, carpenter's square or a rafter square, to mark a right angle, e.g., on two adjoining beams. Either configuration can be utilized for marking right angles or for measuring level and plumb simultaneously.

Referring now to FIGS. 1AA and 1AB a front and bottom view of an assembly 100-AA of three modular levels 104, 105, and 106 coupled to form a drywall square, as a T-shape, in a plane parallel to the side faces of the modular squares, is shown according to one or more embodiments. Assembly 100-AA can be viewed as the carpenter's square from FIG. 1Z with an additional modular level 106 added to end face 120-Y of level 105, such that the side faces of all three levels are in the same plane or in a parallel plane, as indicated by offset 192 in FIG. 1AB, which acts as a fence for marking or measuring square.

Referring now to FIGS. 1AC and 1AD a top and front view of an assembly 100-AC of three modular levels 104, 105-A, and 106 coupled to form a T-square in a plane parallel to the bottom faces of the modular levels, for measuring level in two perpendicular planes, is shown according to one or more embodiments. Similar to FIG. 1AA, levels 105-A and 106 are coupled at their end faces. However, unlike FIG. 1AA, the present embodiment couples end face of level 104 to side face of level 105-A. Thus, level 105-A has a side face configuration similar to that of level 100-K of FIGS. 1H-1L. Assembly 100-AC is useful for measuring level across a wide planar surface that essentially spans multiple axes, e.g., a countertop. A jointed structure can be located at any place on the body of the level, e.g., it does not have to be located on the end of the body, but rather can also be located in the middle of the body if desired. The jointed structure refers to any means or mating structure for connecting a level to another level or an add-on tool, e.g., via threaded post connector and cam or its mating structure to accept the connector, elastomeric strap or structure to accept strap, strap with winch or structure to accept strap, clamp, or any other of a wide range of retention means and structures. In an alternative embodiment, only two modular levels, e.g., 104 and 105-A, are joined to provide level measurement around an inside or an outside corner, e.g. of a room wall, for leveling applications such as window installation or picture hanging, intended to be level with each other.

Retention System

Figure 2A:
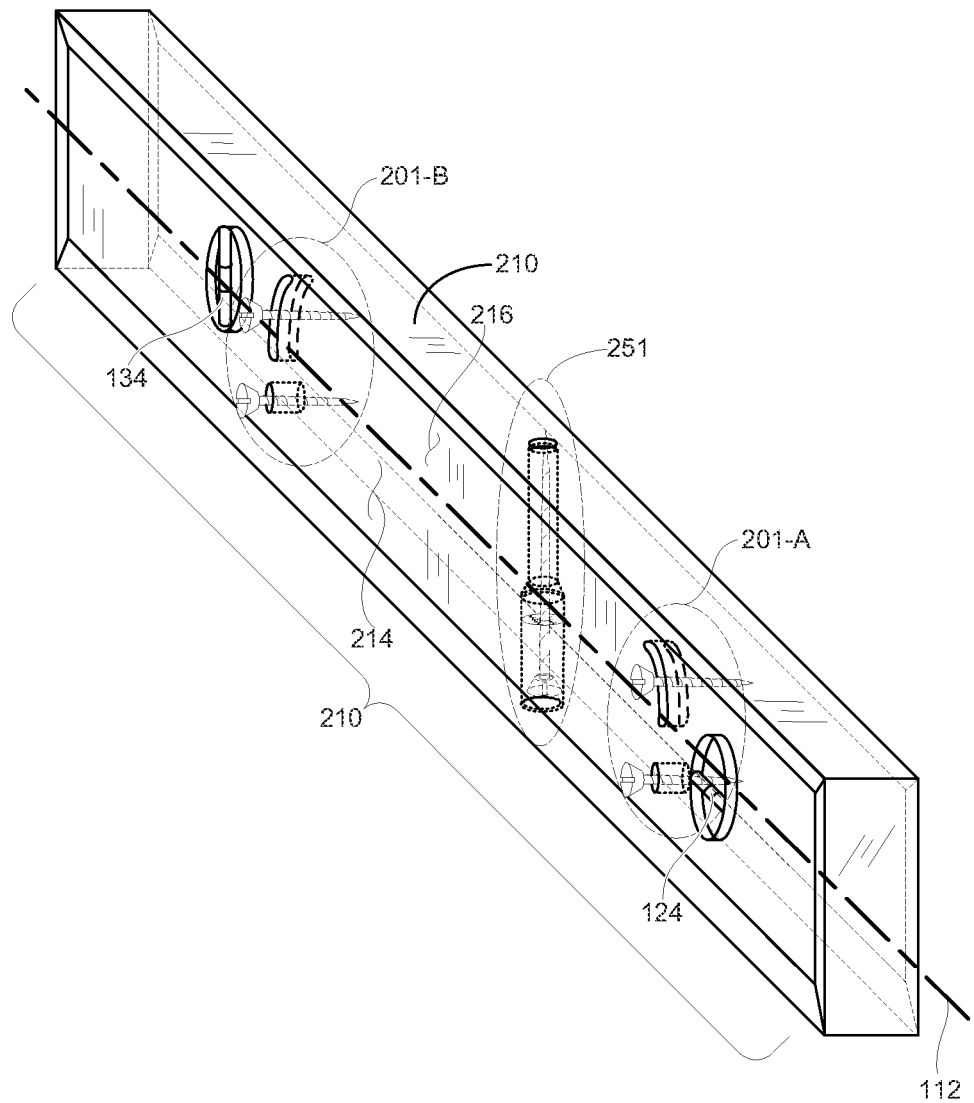
FIG. 2A is an isometric view of a level having a retention system on both the side face and the top surface of the level for securing the level to a work piece for both level and plumb measurements, according to one or more embodiments.

Referring now to FIG. 2A an isometric view of a level 200-A having a retention system on both the side face and the top surface of the level for securing the level to a work piece for both level and plumb measurements, is shown according to one or more embodiments. Level 200-A offers a hands-free measuring and marking of level and plumb since the level can be retained to the work piece or the installation piece. Level apparatus 200-A includes: a body 210 having a longitudinal axis 212 and having two side faces 214, 216 a top and a bottom surface, and two end faces with each end face located at the end of the axis; a side face retaining systems 201-A, 201-B, and a top or bottom face retaining system 251 in the present embodiment. Level 200-A also includes at least one level indicator, for either level or plumb measurement, marking or reading, that is coupled to the body and visible on at least one of the two side faces or a top or bottom surface of the body.

Referring now to FIGS. 2B and 2C a top and side view of a level 200-B having only side face retention connector system 201-A, 201-B located in side face 214, 216 of the level for retaining the level to a work piece, are shown according to one or more embodiments. Side face retention connector system 201-A, 201-B includes structures formed in the body 210 to receive a fastener for coupling the level to a work piece, embodiments of which include an arced slot 214-A, 214-B and a retention hole 216-B, 216-A, respectively, located at a radius 220 from opposite corners. In the present embodiment, fastener 219-B is inserted in retention hole 216-B and driven into a work or installation piece to thereby acting as a pivot point and restraining the pivot point from any linear or angular displacement. Fastener 219-A is inserted in arced slot 214-A and similarly driven into a work or installation piece thereby allowing level 200-B to have independent angular displacement 217 on right end, with a respective smaller and dependent angular displacement 219 on left end, due to pivoting action about pivot point, fastener 219-B.

While the present embodiment illustrates independent pivoting on right end of level 200-B, the fastener arrangement can be reversed to allow independent pivoting on left end of level 200-B. Fasteners 219-B, 219-A can be tightened per user's discretion to allow a loose or a tight slippage of level 200-B against work or installation piece. When desired level or plumb is obtained, fasteners 219-B, 219-A can be tightened fully to prevent movement of level 200-B against work or installation piece. Furthermore, an additional plurality of fasteners can be inserted into remaining arced slot 214-B and retention hole 216-A to provide additional immobilization of level 200-B against work or installation piece, and/or to support work pieces that might rest upon level 200-B during their installation. In the present embodiment, the pitch 221 of left end slotted arc 214-B and retention hole 216-B to right end slotted arc 214-A and retention hole 216-A is equivalent to a standard stud pitch of 16 inches. However, in another embodiment, different modular levels can have a different single pitch between side wall retention systems for use in different applications, e.g., 12, 14, 24, etc. inch pitch. Similarly, another embodiment can have multiple different pitches on the same level, thereby allowing the choice of multiple pitches from a single level. An combination of retention holes and slotted arcs can be placed at any location on level, e.g., for use in a contiguous load bearing work piece, such as a plywood wall, or a contiguous installation piece such as a cabinet. The greater the quantity of retention holes and/or slotted arcs the greater the load that level can bear and the more consistent the level reading, measurement, or marking. Side face 214-B and/or 214-A can be flush in another embodiment, rather than countersunk as shown, either along the entire length of level 200-B or simply in a localized area around side face retention systems 201-A, 201-B, in order to offer full contact against a work or installation piece, and thereby provide a more rigid and stable load-carrying capability.

Referring now to FIGS. 2D and 2E two side views of a level 200-D having a top or bottom surface retention system 251 in an unused, recessed position and in an extended position for engaging a work piece, respectively, are shown according to one or more embodiments. In the present embodiment, retention system 251 is oriented to allow fastener 236 to protrude from top surface 237 to engage a work or installation piece. However, structure in body 221 forming bore 240 can have countersink to depth 239 and diameter to accommodate head of fastener 236, from either top face 237, bottom surface, or both surfaces to allow fastener 236 to protrude from either bottom and/or top surfaces for full configurability. Fastener 236 is retained in level 200-D 234 by a flat disk with slits that engage the threads of fastener 236 to maintain screw tip recessed from top surface 237 when not in use. Alternatively, fastener 236 can be spring-loaded by a helical coil spring so the fastener is automatically retractable into a recessed position so the level may be used sans retainer, e.g., with the fastener not protruding from either of the side faces, or at least not having the sharp tip of the fastener protruding from a side face of the body of the level. In yet another embodiment, fastener can be much longer than the width of the body of the level 200-D in order to accommodate a spacer and still be able to penetrate a work piece. In such an application, selectively removable fasteners would help to prevent injury or damage when self-retention system is not in use.

Figure 2F:
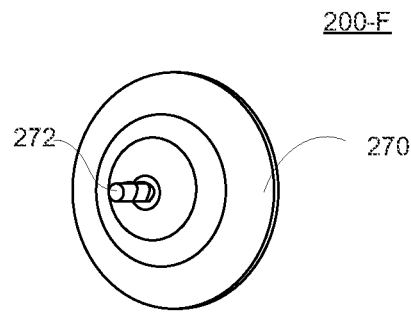
FIGS. 2F, 2G, and 2H are isometric views of alternative embodiments of connectors for retaining a level to a work piece or installation piece, according to one or more embodiments.
Figure 2G:
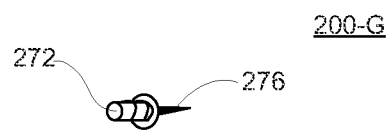
Figure 2H:
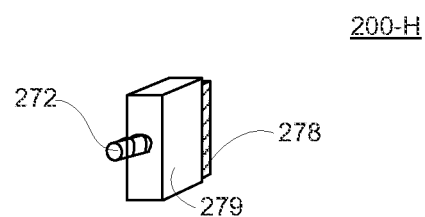

FIGS. 2F, 2G, and 2H are isometric views of alternative embodiments of connectors for retaining a level to a work piece or installation piece, according to one or more embodiments. Referring to FIG. 2F a suction cup 200-F having a conical cup 270 and a retainer 272 to retain it in level, e.g., screw into retainer hole 216-A, 216-B. FIG. 2G is a push pin retainer 200-G that allows level placement against softer materials such as soft wood, plywood, drywall, etc. in order to retain or prevent slippage of level. Push pin retainer 200-G includes a retainer to retain it in level, e.g., screw into retainer hole 216-A, 216-B. FIG. 2H is a magnet. Alternative embodiments of a connector for retaining a level to a work or installation piece include a nail, clamp, repositionable adhesive material, self-tapping fasteners, quarter-turn fastener, a fastener with a wing nut, thumb screw, or knurled knob for finger tightening, or any other device that allows selective coupling. While top or bottom surface retention system 251 is located near the center of the length of level, alternative embodiments can locate top or bottom face retention system, e.g., structures forming a hole to accept a fastener, anywhere along level 200-D, and in another embodiment can utilize a plurality of top or bottom surface retention systems 251.

In an alternative embodiment, retention hole 216-B, 216-A can be created by making an oversize hole in body of level, then installing an insert into which a fastener may be placed. An insert can help prevent damage to the body of the level by having a material that locally absorbs the load and damage from using a fastener therein. Additionally, an insert can have some flexibility built into it as well, e.g., using phenolic resin or hard rubber captured sleeve that helps to accommodate misalignments, over tightening, etc.

Adjustment System for Angular or Translational Positioning

Figure 3A:
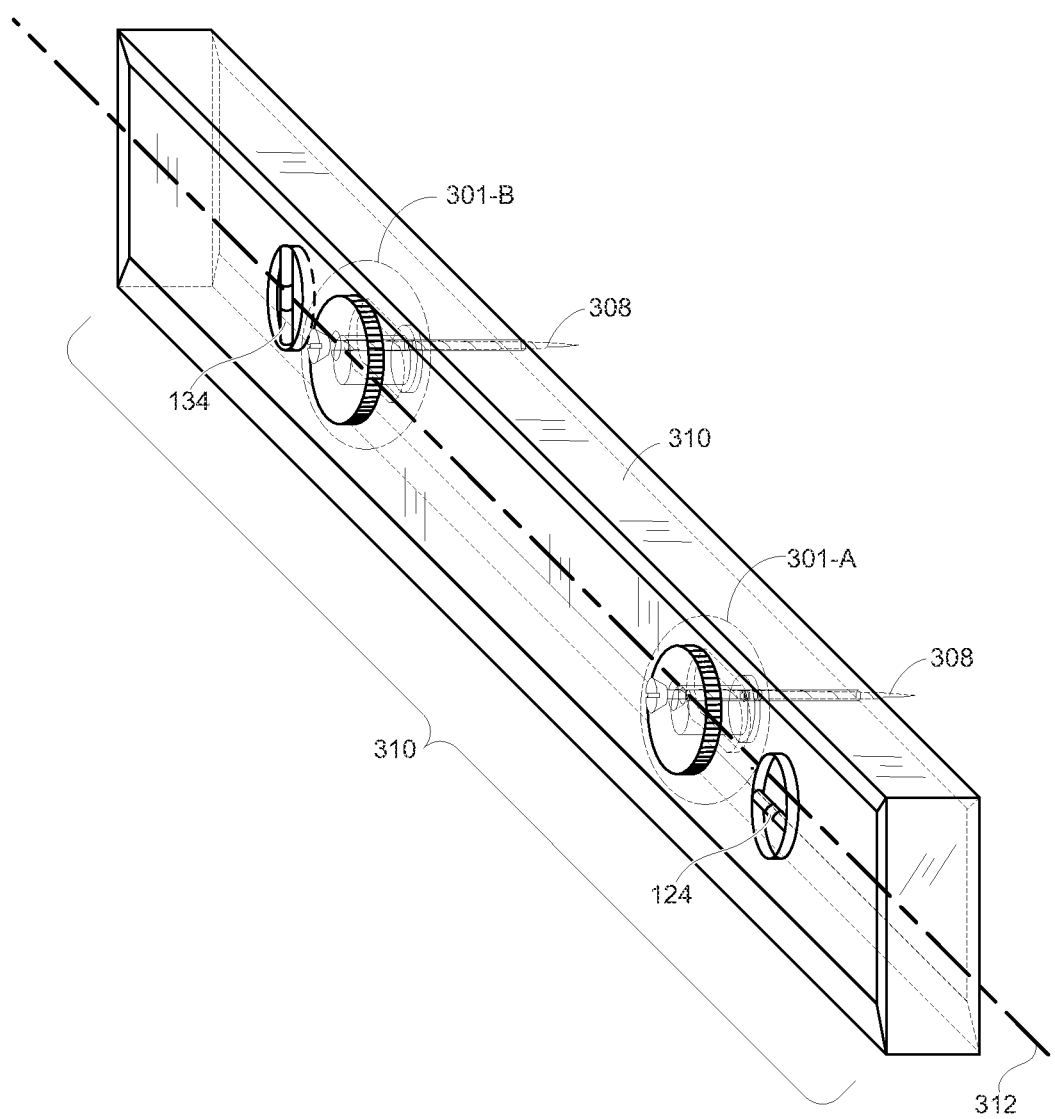
FIG. 3A is a side view of a level with only an angular adjustment system using a single cam, according to one or more embodiments.

Referring now to FIG. 3A an isometric view of a level 300-A with an angular and/or translational adjustment system 301-A, 301-B, is shown according to one or more embodiments. Level 300-A includes: a body 310; a level indicator 124 and/or a plumb indicator 134 housed in body 310 and visible on either a side face and/or top or bottom surface of the body; optional fasteners 308 as inserted into angular and/or translational adjustment system 301-A, 301-B, referred to as a cam-type adjustment in the present embodiment. Body 310 includes: a longitudinal axis; two side faces; a top and a bottom surface; two end faces with each end face located at the end of the axis; and a structure in the body to receive a fastener for coupling the level to a work piece. Angular and/or translational adjustment system 301-A, 301-B is coupled, or retained, in the body 310, wherein the adjuster is selectively adjustable to provide movement of level 300-A against a work piece (not shown).

Referring now to FIG. 3B a side view of a level 300-A with two angular and/or translational adjustment systems 301-A, 301-B using cams, is shown according to one or more embodiments. Angular and/or translational adjustment system, or simply adjuster, 301-A, 301-B includes a structure to receive a fastener for selectively coupling the level to a work piece; wherein the fastener is a screw 308-A in the present embodiment, or a nail, suction cup, magnet, clamp, etc. alternative embodiments e.g., as presented in FIGS. 2A through 2H, to selectively couple the adjuster to the work piece. An optional rotatable sleeve captured in adjuster 301-A, 301-B can allow easier rotational movement of adjuster 301-A and 301-B while adjuster 301-A, 301-B is fastened to work piece. Adjusters 301-A, 301-B are selectively adjustable and rotatably retained in body 310 to provide a plurality of degrees of freedom, e.g., a first degree of freedom that is translational and/or a second degree of freedom that is rotational. Translational movement 361 is the displacement 360-A and 360-B of both ends of level 300-A in the same direction, resulting in movement perpendicular to the axis 312 of the body of the level. Translational movement 361 is accomplished when the both adjuster 301-A and 301-B are rotated to move both ends of level in the same direction. The second degree of freedom is rotational or angular movement 360-A or 360-B of level 300-A against the work piece. Angular rotation 360-A or 360-B is accomplished by adjusting only one adjuster 301-A or 301-B or by adjusting both adjusters 301-A and 301-B in opposite directions, e.g., to cause one end of level to rise and the other to fall. By using a plurality of adjusters, both ends of level 300-A can be adjusted, thereby providing an optional pure translational movement 361 of level 300-A, e.g., either up or down, while keeping level 300-A in a level reference position 350. Adjusters 301-A, 301-B include a round cylinder 322 having a center body, and a retaining flange, and wherein a structure for accepting fastener is positioned in cylinder 322 at a point offset from the center of the cylinder in order to provide a cam movement when cylinder 322 is turned. Adjuster 322 can optionally be selectively coupled to a spacer, as described in subsequent FIG. 4A, that extends beyond side face 316 in order to provide a gap between the level 300-A and a work piece, e.g., in order to accept an installation piece to be leveled.

The structure in the body, e.g., a bore, 309-A, 309-B to receive the fastener is aligned with the position of adjusters 301-A, 301-B, respectively, to provide additional retainment strength for level 300-A against work piece after level 300-A is suitably positioned using adjusters 301-A, 301-B, as described in previous FIG. 2A.

In another embodiment, a method of adjusting level 300-A includes: receiving a level 300-A having a body 310 with a longitudinal axis 312, two side faces, a top and a bottom surface, and two end faces with each end face located at the end of the axis and having an adjuster retained in the body, wherein the adjuster 301-A or 301-B is selectively movable, or rotatable, to provide movement of level 300-A against a work piece; placing level 300-A against a work or installation piece; and adjusting one or more adjuster(s) 301-A, 301-B on level 300-A in order to move level 300-A with respect to the work or installation piece in order to obtain a desired angle, reading, offset, level position or translated position. Adjusters 301-A, 301-B are fixedly coupled to the work or installation piece and movably coupled to the level in order to allow level 300-A to move with respect to the installation or work piece.

Referring now to FIG. 3C a side view of a level 300-C with only a single angular adjustment system 301-A using a cam, is shown according to one or more embodiments. Fastener 308-B is inserted in hole 309-B to provide a pivot point about which level 300-C can exhibit only a single degree of freedom of being angularly displaced 360-A.

Figure 3D:
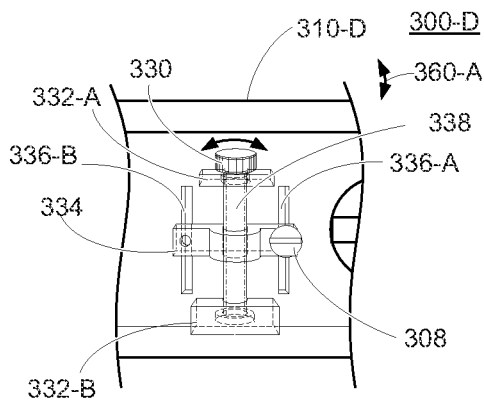
FIGS. 3D, 3E, 3F, 3G are front views, and FIG. 3H a side view, of alternative embodiments for angular and/or translational adjustment system for a level, according to one or more embodiments.
Figure 3E:
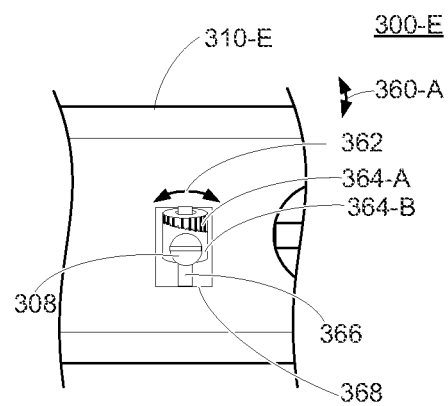
Figure 3F:
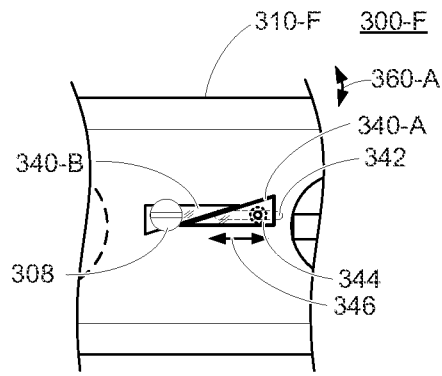
Figure 3G:
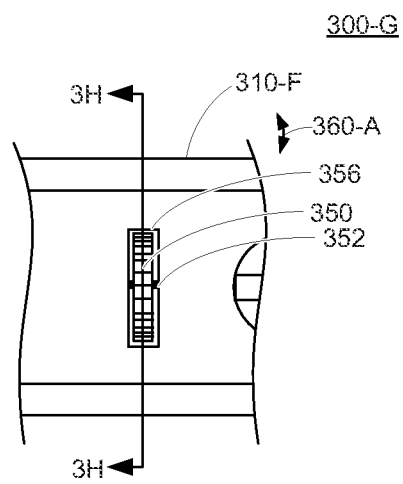
Figure 3H:
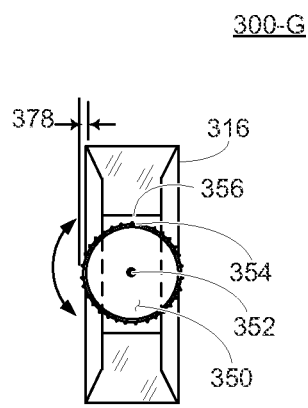
FIG. 3B is an isometric view of a level with two angular and/or translational adjustment systems using cams, according to one or more embodiments.
FIG. 3C is a side view of a level with a singular angular and/or translational adjustment system using a cam, according to one or more embodiments.

Referring now to FIGS. 3D, 3E, 3F, 3G front views, and to FIG. 3H side view, of alternative embodiments for angular and/or translational adjustment systems for a level, are shown according to one or more embodiments. Use of only one adjuster located at an end of a level will provide a single degree of freedom, e.g., angular rotation, while use of only one adjuster located near the center of the length of the level can provide a single degree of freedom, e.g., linear translation up and down, assuming the level is rotationally stable. Use of two adjusters located at either end of a level will provide two degrees of freedom, e.g., both angular rotation and linear translation up and down. FIG. 3D illustrates a screw adjustment system wherein a head 330 can be turned that moves a rack 334 translatably retained in slots 336-B, 336-A in body 310-D of level 300-D. Rack 334 is coupled to work piece by at least one fastener 308 that passes through slots 336-B, 336-A. FIG. 3E illustrates wedge-dial adjustment system having a dial 364-A with a wedge bottom surface that mates with a wedge top surface of a lower dial 364-B having a fastener 308 couple it to a work through slot 366 within which shank of fastener 308 can travel as level 300-E is traversed. FIG. 3F illustrates a wedge adjustment system 300-F having: a wedge structure 340-B affixed to level and coupled via fastener 308 to a work piece; a mating wedge 340-A that is movable coupled to body 310-F of level 300-F such that lateral movement 346 of wedge 340-A in slot 342 allows movement of level 310-F due to mechanical wedge action thereby creating angular displacement 360-A. FIGS. 3G and 3H illustrates a front and a cross-sectional view, respectively, of transverse wheel adjustment system 300-G including: wheel 350 rotatably disposed on shaft 352 within opening 356 of body 310-F. Wheel 350 includes a slip-resistant surface 354 that protrudes a distance 378 from side face 316 in order to contact work or installation piece, but is compressible under load to allow side face 316 to rest flatly against work or installation piece. Other adjuster embodiments can include any cam, wedge, dial, rack and pinion, screw, or any other system that provides the translational and/or angular movement of the level for purposes of aligning it to level, plumb, an angle, or an offset.

As an alternative to optional fasteners 308, adjustment system 301-A and/or 301-B can utilize a non-slip backing on back face of assembly 322 that buts against work piece or installation piece, with rotational freedom vis-à-vis dial 320 to allow the translational or angular adjustment while being retained against the work piece or installation piece. An example is provided in subsequent FIG. 8B showing back face 372 of spacer 401-A that is coupled to the back face 370 of adjuster 301-A. In another embodiment, adjuster 301-A, 301-B includes a ⅜ inch receptacle to allow for a socket drive, to provide extra leverage to obtain angular and translational adjustment of level when heavier loads, such as a window or a set of tiles are placed on the level. A different embodiment of angular and translation adjustment system provides adjusters on end faces 374, 376 (not shown) for placement of a single level between two surfaces, e.g., between two walls such as in a shower tile installation application, where the level can be adjusted upwards to sequentially check level of, or provide a level surface for, rows of tiles. If multiple modular files are joined to provide the needed width between work pieces, e.g., shower walls, then the ends of the composite file utilize the adjusters, while the jointed ends between levels have connectors to enable modular coupling of the multiple levels.

Spacer Offset System

Figure 4A:
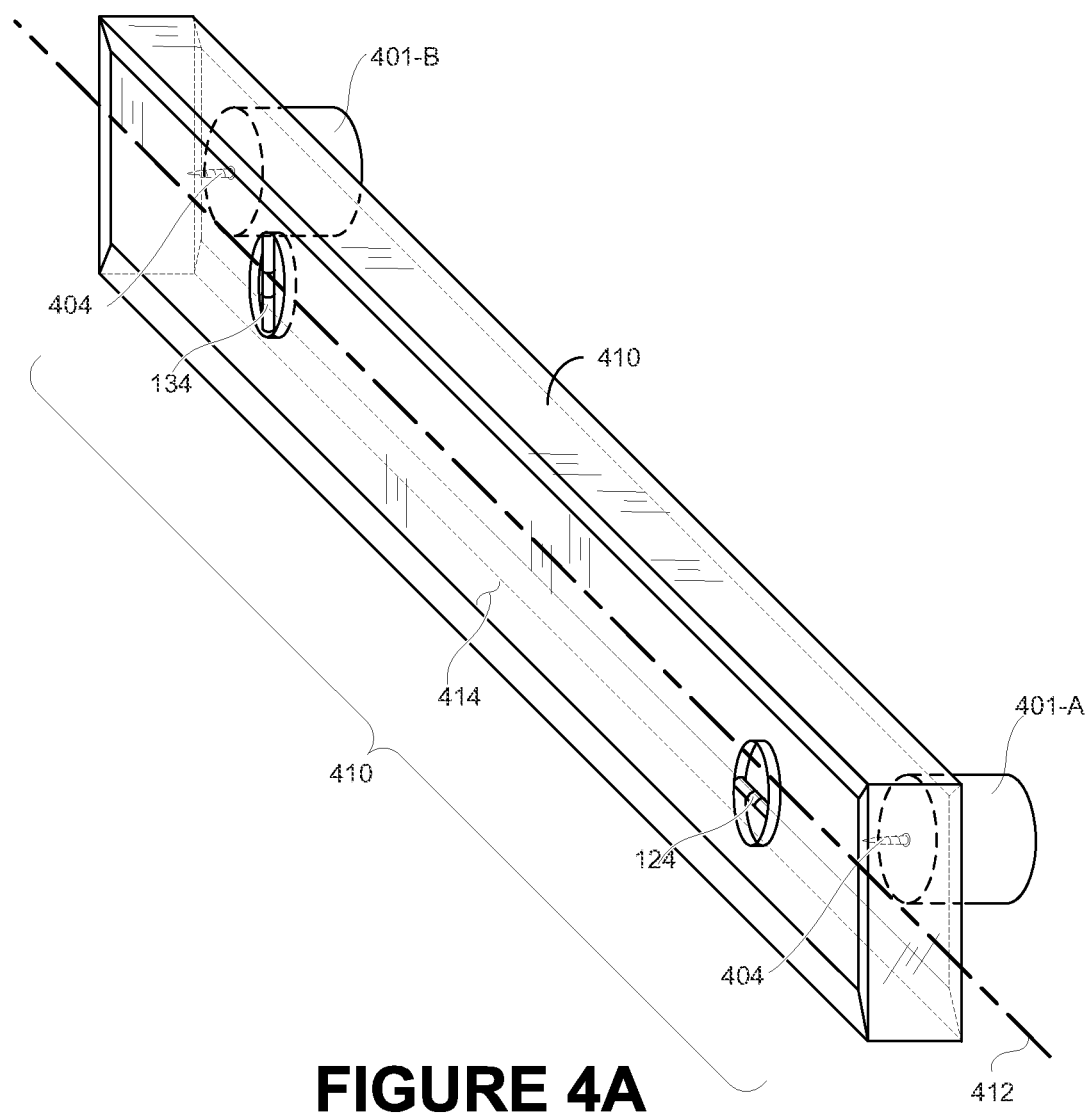
FIG. 4A is an isometric view of a level with spacers coupled to a side face for offsetting the level from a work piece for a level measurement, according to one or more embodiments.

Referring now to FIG. 4A an isometric view of a level 400-A with spacer offset system coupled to a side face for offsetting the level from a work piece for a plumb or level measurement, is shown according to one or more embodiments. Level 400-A includes: a body 410 having a longitudinal axis 412 and having two side faces, a top and a bottom surface, and two end faces with each end face located at the end of the axis; and one or more spacers 401-A, 401-B coupled to the body 410, wherein spacers 401-A, 401-B extend a consistent, or same, distance beyond body 410 for consistent level measurement, e.g., extend beyond at least one of the two side faces, e.g., 414 or beyond the top or bottom surface, wherein the spacer offsets the body from a work piece to avoid an obstacle on the work piece or to accommodate an installation piece between level 400-A and work piece. Spacers can extend an inconsistent distance to compensate for a known step in a work or installation piece. Spacers 401-A, 401-B can also be spaced apart to allow one or more installation piece to be disposed on top of level with a portion of the installation piece, e.g., a flange, to be placed between the level and the work piece, such as a wall, thereby providing a level baseline surface on which the installation piece may rest and be supported during its installation process. Subsequent FIG. 10C provides an example of such an installation. As such, distance between spacers 401-A and 401-B can be fixed at a given stud pitch, e.g., 16 or 24 inches or some other distance, with an optional slot to allow for minor adjustments to accommodate stud misplacement or non-traditional spacing.

Spacers 401-A, 401-B can be single spacer if sufficiently wide and/or sufficiently attached to work piece so as to provide stability of level, e.g., wide rectangle offset piece coupled in multiple locations to middle portion of level and coupled to work piece in multiple locations so as to provide clearance for installation piece or for obstacle on work piece located on both ends of the level. Alternatively multiple spacers having equal offset can be coupled to body 412 to provide a stable offset from a work piece, such as the present embodiment having a spacers located near each end of level 400-A.

Spacer 401-A, 401-B can be permanently, selectively, slidably or hingedly coupled to the body. By being slidably coupled, e.g., within a slot of body 410, spacer 401-A, 401-B can be aligned with a given work or installation piece. Removably coupled spacer 401-A, 401-B can be retained by: a screw whether wood or machine threads and with fastener head adapted for a driver or for a finger tightening mechanism like wing-nut or knurled head; detent quick release coupling; detent interference fit; sprint-loaded tangs, suction cup, magnet, or any other selectively removable coupling mechanism that would allow a stable coupling of spacer and selective removal of spacer from body of level. In an alternative embodiment spacer is hingedly coupled to level so as to swing out of position into a recessed area of level and thus avoid interfering with access to one or more surfaces of level during leveling or plumbing functions. Spacer can also be retained in a vertical and/or horizontal slot(s) in body of level, thus allowing spacer positioning to avoid installation piece. Spacer can also be uncoupled to level, instead relying on a fastener used for level retention to hold spacer in place via a hole in spacer through which fastener is placed.

Spacers 401-A, 401-B can selectively extend from a recessed of flush position on body 410, with respect to side face 414, out to a position that provides sufficient clearance between the level and a work piece, such as a telescoping cylinder, spring-loaded popup spacer, folding scissor arms, etc. Spacers 401-A, 401-B can any shape, such as cylindrical, a square, rectangular, or any other shape that proves a stable offset between level and work or installation piece.

The face of spacer 401-A, 401-B that mates with or couples to a work piece can have a removable coupling as well, such as a push pin, clamp, repositionable adhesive, etc. in one embodiment includes a fastener coupled to a back, or exposed, face of the spacer, the fastener for coupling the level apparatus to a work piece. Spacer can provide a structure through which a fastener may be placed thereby allowing the fastener head to bear on body 410 of level in drawing level 400-A to work piece, thereby sandwiching spacer in compression between the two and providing a stable level reference.

Figure 4B:
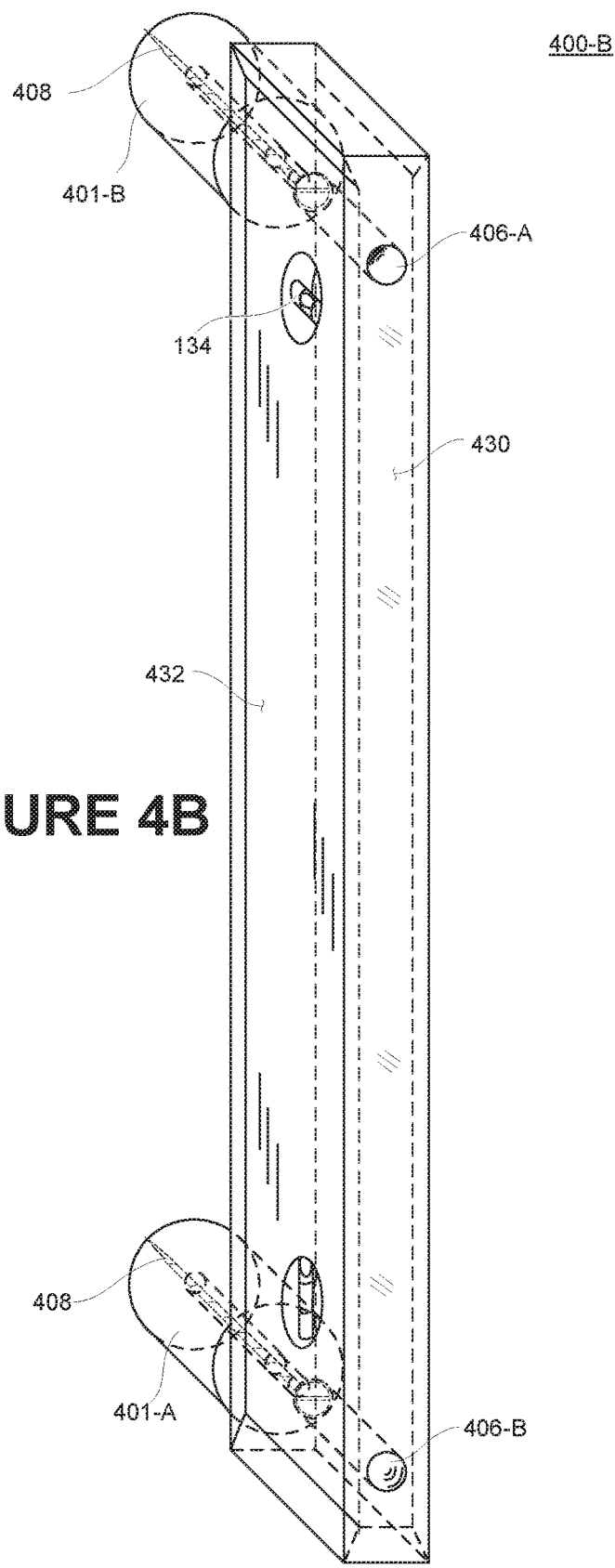
FIG. 4B is an isometric view of a level with spacers coupled to a bottom face for offsetting the level from a work piece for a plumb measurement, according to one or more embodiments.

Referring now to FIG. 4B an isometric view of a level 400-B with spacers 401-A, 401-B coupled to a bottom face 432 for offsetting level 400-B from a work piece for a plumb measurement using plumb vial 134, is shown according to one or more embodiments. Spacers 401-A, 401-B have equal length, thereby offsetting level 400-B an equal distance from a work piece, protrude in a direction parallel to the axis formed by the plumb vial, and have a bore through which fasteners 408 threaded through bore with countersink 406-A, 406-B in body 410 may be placed, as also illustrated in FIGS. 2D and 2E. Countersunk bore 406-A, 406-B can provide for fasteners 408 to be inserted from either the bottom surface 432 or the opposite top surface. Distance between spacers 401-A and 401-B can be 8, 9, or 10 feet to accommodate wall heights of approximately the same height, or some other distance for a given application. The present embodiment is useful for application as a plate level for plumbing walls for a building.

Figure 4C:
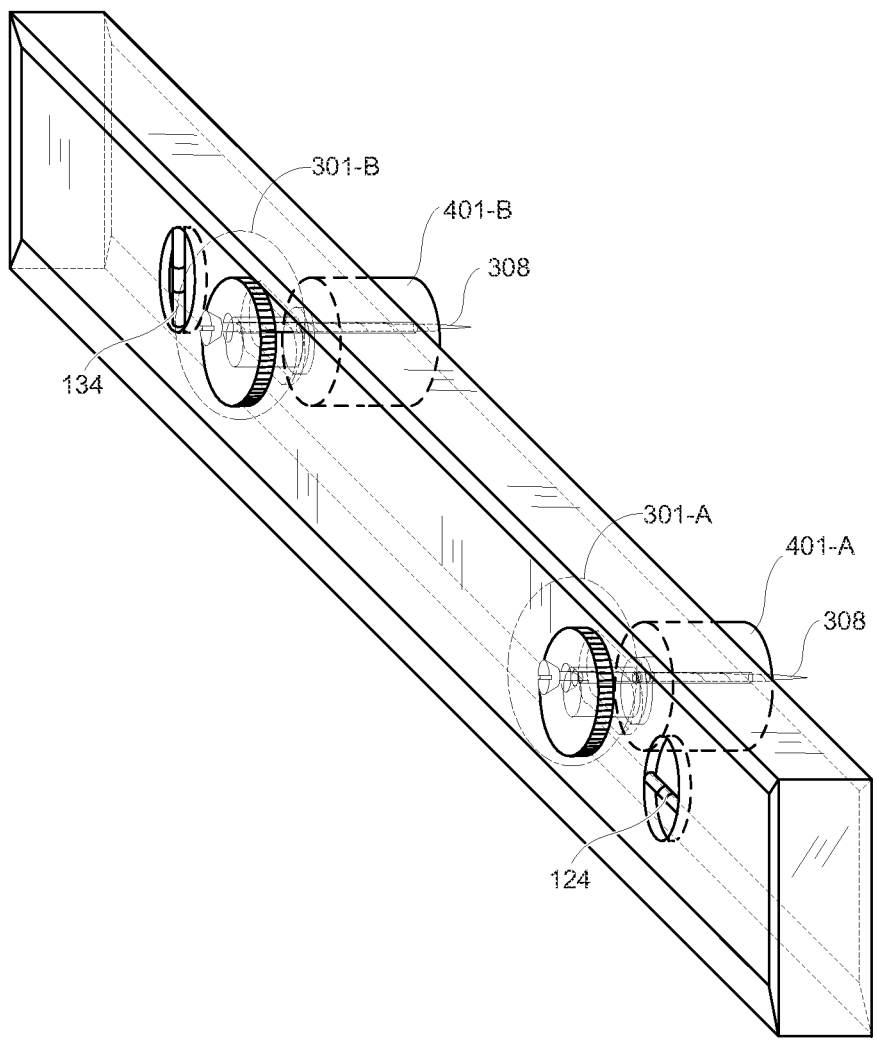
FIG. 4C is an isometric view of a level with spacers coupled to an angular and/or translational adjustment system, according to one or more embodiments.
Figure 4D:
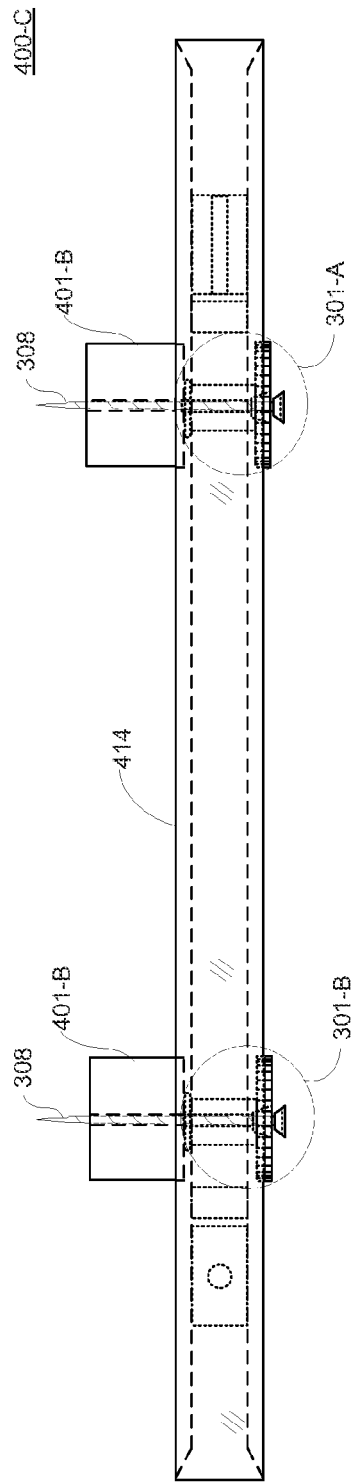
FIGS. 4D and 4E are a top and front view of a level with spacers combined with an angular and/or translational adjustment system, a according to one or more embodiments.
Figure 4E:
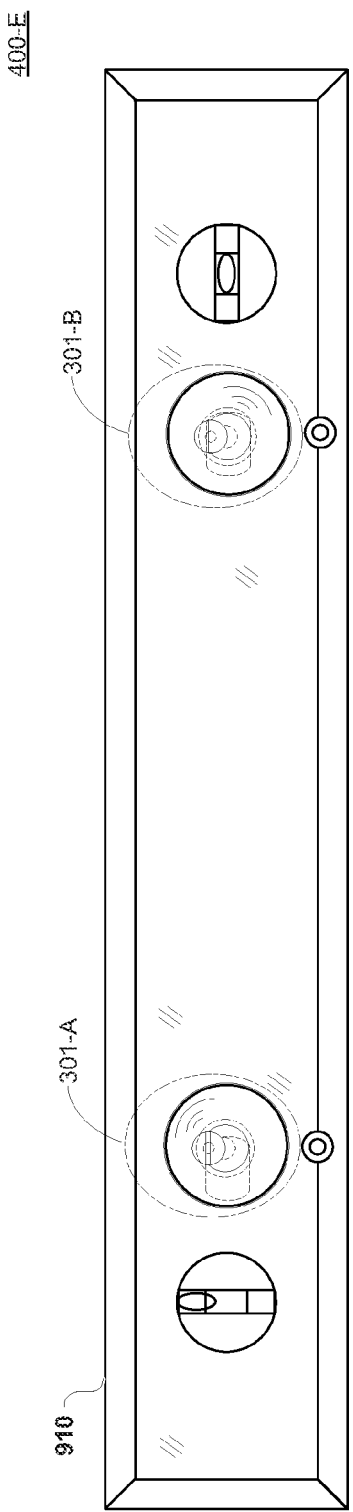

Referring now to FIGS. 4C, 4D, and 4E an isometric top and front view, respectively, of level 400-C with fasteners 308 for side face retention to work piece coupled to spacers 401-A, 401-B, and angular and/or translational adjustment systems 301-A, 301-B, respectively, are shown according to one or more embodiments. Level 400-C can be a system having any combination of two or more embodiments of the following features and functions: fasteners per FIGS. 2B and 2C for side face retention of level to work piece; spacers per FIG. 4A for providing an offset of level from work piece; and adjustment systems per FIGS. 3A through 3C for adjustment the angularity and translation of the level to obtain a desired level, plumb or pitch position for the level. Thus, a synergy arises from combining all three independent features together in a single level assembly.

Slip-Resistant System

Figure 5A:
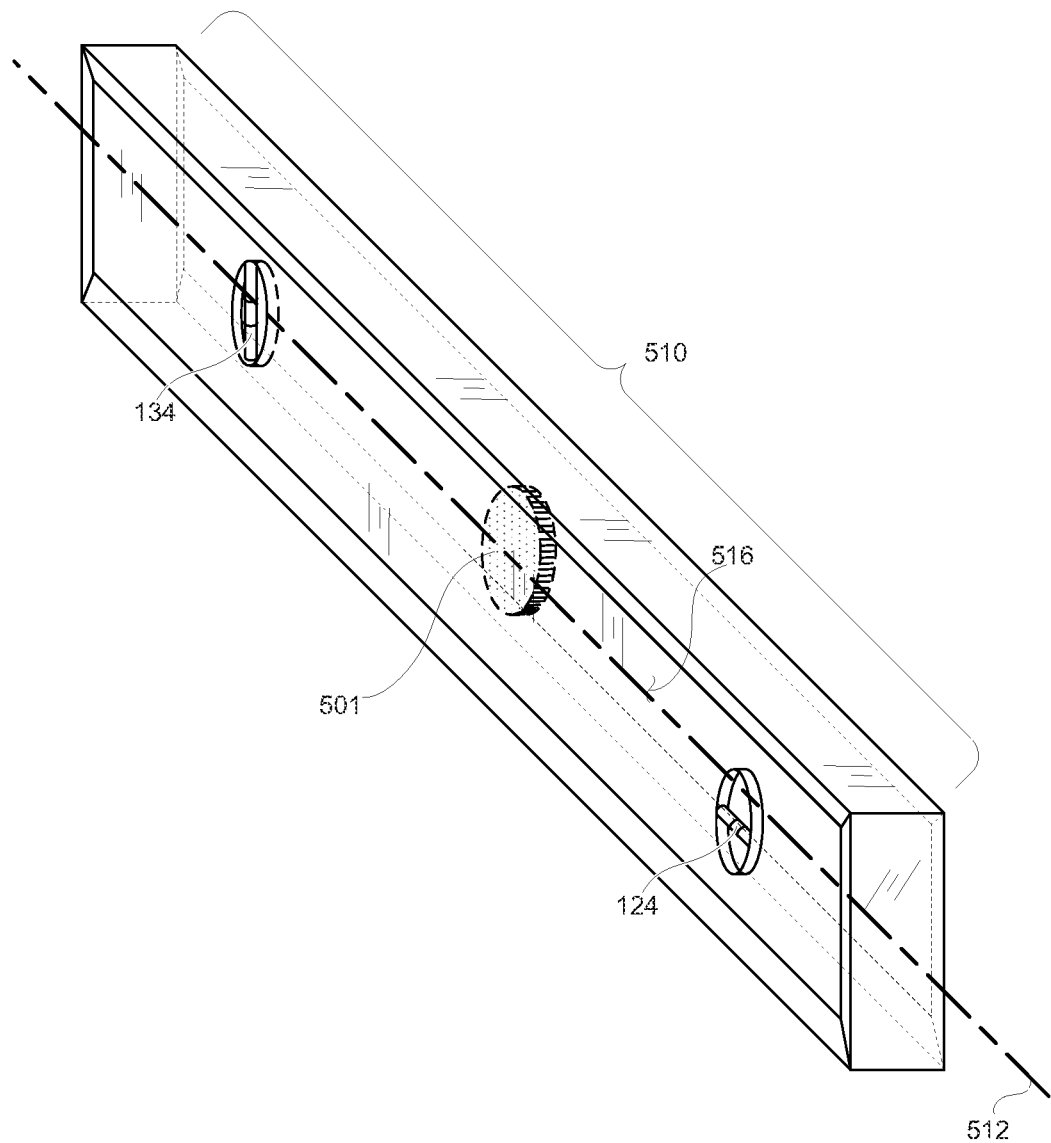
FIG. 5A is an isometric view of a level with a slip-resistant system on a side face of the level, according to one or more embodiments.

Referring now to FIGS. 5A, 5B and 5C an isometric view, top and front view, respectively, of a level 500-A with a slip-resistant system 501 on a side face 516 of the level, is shown according to one or more embodiments. Level 500-A includes a body 510 having a longitudinal axis extending a given length and having two side faces, a top and a bottom surface, and two end faces with each end face located at the end of the axis; a level vial 124 and/or a plumb vial 134 coupled to body 510; and a slip-resistant system 501 coupled to body 510. Slip resist system 501 is provided to help retain level 500-A in a desired position without slipping, while a user jostles to make a measurement, marking, or reading is taken. However, slip-resistant system 501 is not excessively sticky so as to hinder taps and nudges to help position level 500-A into place for a level or plumb measurement, marking, or reading. Slip resistant system 501 includes a single compressible non-slip surface such as a pad 506, located centrally on side face 516-A, and coupled to a base 504 which is then coupled to side face 516-A by coupling agent 502, such as adhesive, selectively removable hook and loop fastener, snap, detent, etc. which can be either permanent or removably coupled for cleaning or replacement. Alternatively, non-slip pad can be rotatably coupled to the body, e.g., via a snap, to allow rotational movement of the level, but to resist translational movement of the level.

Non-slip pad 506 is any compressible material, e.g., closed cell foam, cellulose sponge, non-slip cushioning mat material, etc. that offers slip-resistant properties against typical building materials such as wood, plywood, painted surfaces, doors, windows, drywall, etc. Base 504 can be any type of material such as plastic, wood, or rubber that couples the non-slip pad to coupling agent 502. While slip-resistant system 501 has thickness 512 that extends beyond side face 516-B in an uncompressed mode, the slip-resistant system 501 is compressible to be flush with side face edge 516-B given very slight load, e.g., the weight of the level itself, 16 to 24 ounces of pressure, etc. While the present embodiments show slip-resistant system 501 applied to side faces of level, it can also be applied to a recessed cavity (not shown) in top and/or bottom surface as well.

Referring to FIGS. 5D and 5E a top and front view of level 500-B with an alternative layout of slip-resistant system 502 on a side face of the level, is shown according to one or more embodiments. A plurality of non-slip pads 520 are coupled to the body 510, wherein the plurality of non-slip pads are positioned at the corners of the side face 516-A. Slip resistant system 501 is adaptable to a wide variety of sizes and locations, as desired by user preferences for reducing slippage and providing a stable platform from which to measure, mark, and read level and plum and offsets.

Offset Gauge

Figure 6A:
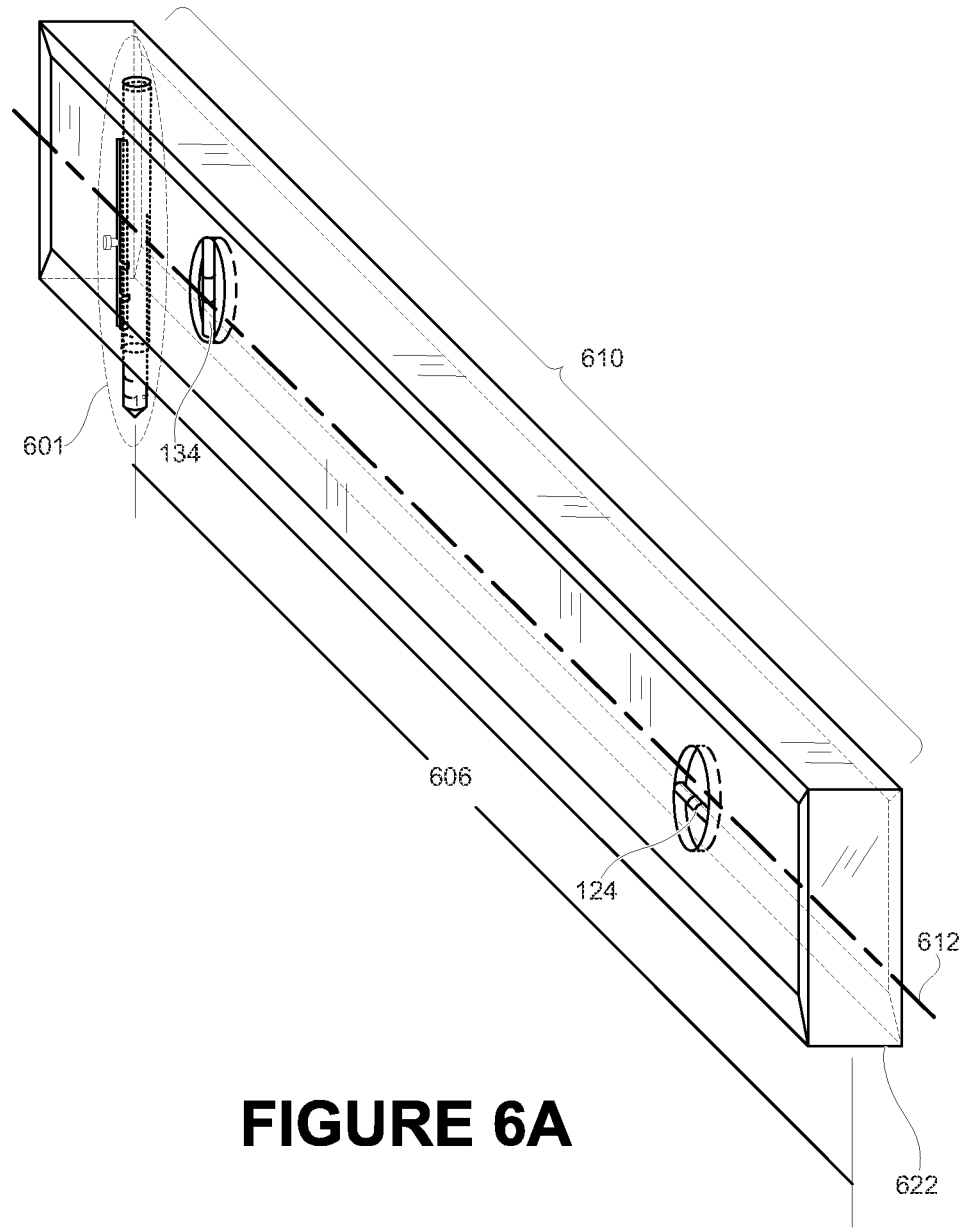
FIG. 6A is an isometric view of a level with an offset gauge for measuring slope or pitch of a work piece, according to one or more embodiments.

Referring now to FIG. 6A, an isometric view of a level 600-A with an offset gauge system 601 for measuring slope or pitch of a work piece is shown, according to one or more embodiments. Level apparatus 600-A includes: a body 610 having a longitudinal axis extending a given length and having two side faces, a top and a bottom surface, and two end faces with each end face located at the end of the axis; a level vial 124 and/or a plumb vial 134; and an offset gauge system 601 coupled to body 610 proximate to one of the end faces, wherein the offset gauge extends a predetermined distance from the bottom face 632 of the body 610 to provide a predetermined slope or pitch normalized for the given length 606 of the body from a distant edge 622 to the tip 608-A of offset gauge pin 602. Alternative end 608-B has radius 611 to provide a centering function of level on a top of a pipe or tube diameter or other curved surface, thereby offering better stability and level measurement.

Figure 6B:
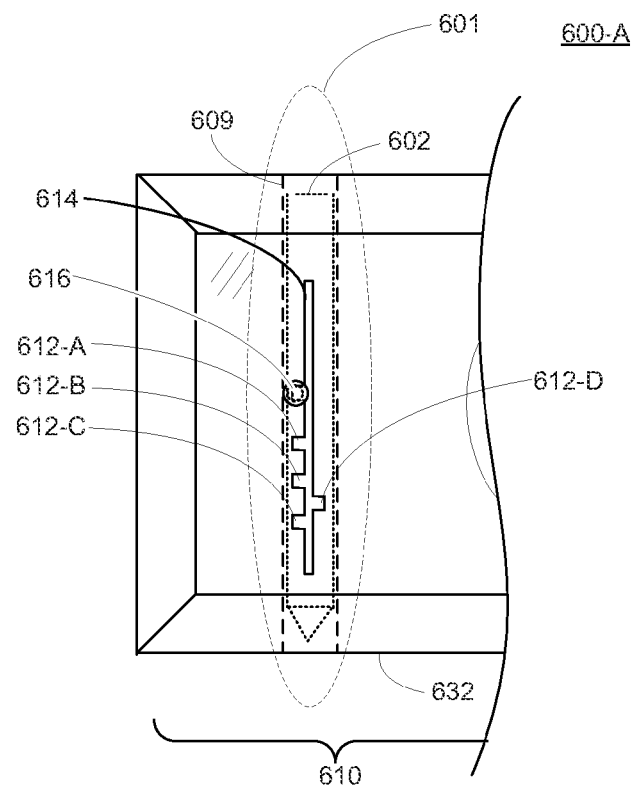
FIG. 6B is a side view of a level with an offset gauge in a retracted position, according to one or more embodiments.

Referring now to FIG. 6B, a side view close-up of the offset gauge pin, or extension, 602 in a refracted position in level 600-A is shown, according to one or more embodiments. Offset gauge system 601 includes offset pin 602 located inside a bore 609 in body 610. Offset pin 602 has a selector 604 that screws into offset pin 602, and that slides vertically in slot 614 of body 610 and horizontally in slots 612-A through 612-C with an optional press fit to retain selector 604 to selected position for different predetermined degrees or pitches of offset. Pin 602 can have a slip or friction fit in body 610 with a topmost horizontal slot 616 for parking the offset pin 602 in a retracted position, e.g., recessed from face 632 to avoid interfering with typical level and plumb measurements and readings. Pin 602 can also be spring loaded into a retracted position, to avoid unintentional interference with normal level operation, by locating coil spring around outer diameter of pin, and retaining spring in a recess in body 610. Horizontal slots 612-A, 612-B, and 612-C accept selector 604 to place offset pin 602 in extended positions beyond bottom surface 632.

Figure 6C:
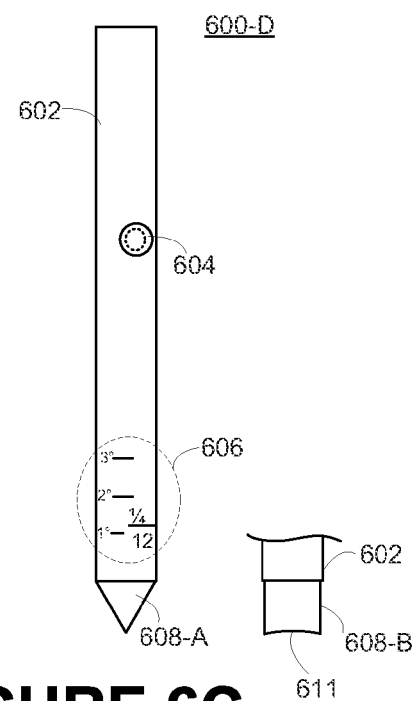
FIG. 6C is a detail view of offset gauge in enlarged view to illustrate exemplary offset settings, according to one or more embodiments.

Referring now to FIG. 6C, a detail view of offset gauge pin 602 in enlarged view to illustrate exemplary plurality of standard offset settings 606 is shown, according to one or more embodiments. In particular, offset settings 606 include a 1°, 2°, and 3° setting on the left side of pin 602 and a pitch of "¼/12" on right side of pin 602 for representing a typical plumbing code minimum drain pitch requirement of ¼ inch drop over 12 inches of run. Offset settings 606 are shown at bottom surface 632 when selector 604 is placed in horizontal slots 612-A, 612-B, 612-C, and 612-D, respectively. In an alternative embodiment, offset gauge pin 602 and or markings on body 610 of level can provide multiple scales of measurement, each scale applicable for a given length of level, wherein one length is a composite length of a given number of modular joinable levels Thus, one scale can be for a single three-foot level, while another scale can be for a 9-foot level formed by the modular combination of three three-foot levels, the latter for providing a longer and more accurate slope measurement.

Figure 6D:
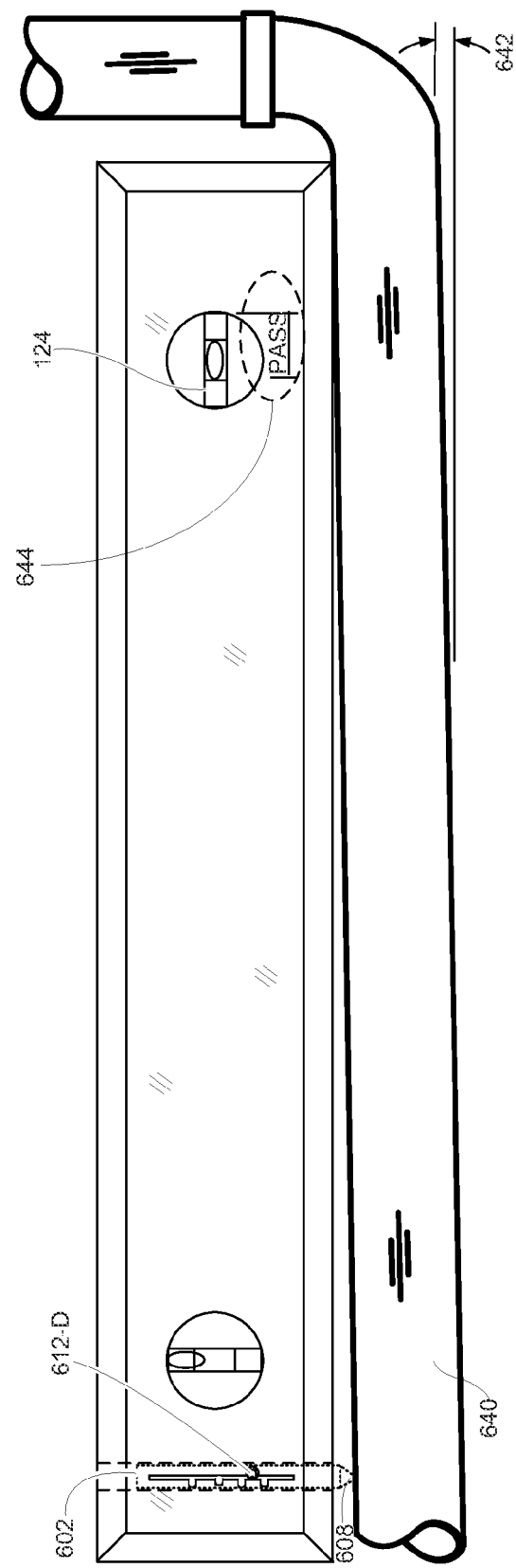
FIG. 6D is a side view of a level with an engaged offset gauge applied to a plumbing drain work piece to confirm a minimum slope required by code, according to one or more embodiments.

Referring now to FIG. 6D, a side view of level 600-A with an engaged offset gauge applied to a plumbing drain work piece 640 to confirm a minimum slope required by code is shown, according to one or more embodiments. Offset gage pin 602 is positioned in slot 612-D for "¼/12" pitch setting for plumbing code minimum drain pitch requirement. Level 600-A Level is marked with a "PASS" zone for middle and right portions of level vial 124 because if drain work piece 640 has a pitch of ¼/12 or more, then the bubble in level vial 124 will be in the middle 'level' zone, as shown in the figure, or in the rightmost zone representing a pitch greater than ¼/12, which would exceed the minimum pitch requirement and thus qualify to 'pass' per code.

In alternative embodiments, offset gauge can be a rod, a flat or curved plate, or a blade extension that is selectively extendable to be recessed in body or extend beyond bottom surface of the level, or can be a coiled and retractable tape measure with an optional hold button that is coupled to, or disposed inside of, body 610; etc., all of which would have at least one, and alternatively a plurality of extension points, to represent at least one slope, or a plurality of slopes, pitches or angular measurement in degrees. A pin or a flat blade on offset gauge allows it to sit on a curved surface of plumbing pipe or other flat or curved surfaces and yield a consistent and accurate measurement. Alternatively, flat blade can have an edge with a sufficiently large radius, e.g., 2 inches that would help to center it on curved pipes up to a typical maximum diameter of 4 inches. In lieu of a selector and slots to select offset positions, a ball and detent mechanism can be used for preset offset values. Level can be coupled to a work piece via one or more spring clamps, or a strap with hook and loop fasteners, coupled to a modular end of level 600-A or coupled via a fastener in bottom face retention bore, with an appropriate calibration of the offset measurement markings on the offset pin.

Protective Cover

Figure 7A:
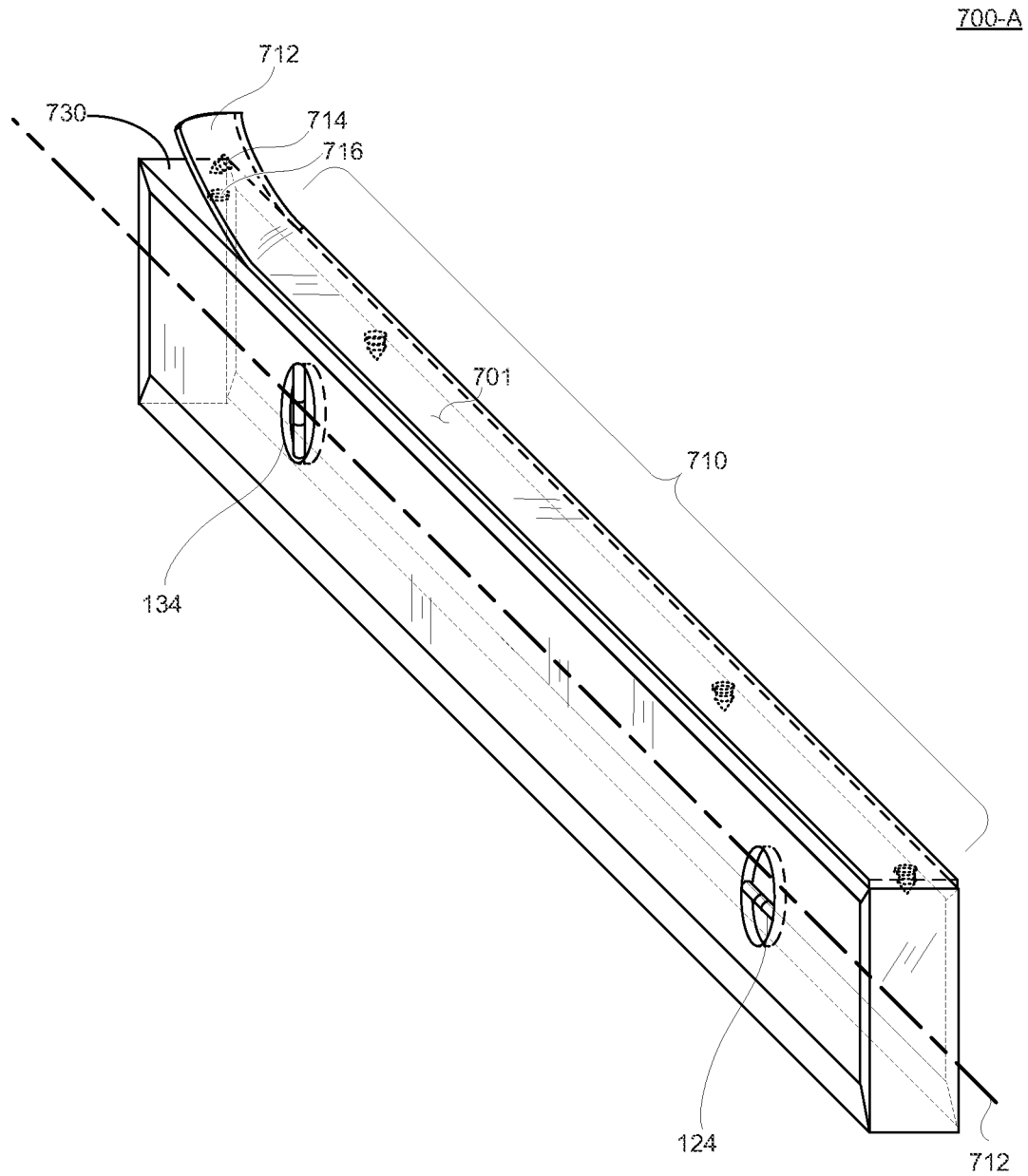
FIG. 7A is an isometric view of a level with a protective cover for contaminating work environments, according to one or more embodiments.

Referring now to FIGS. 7A, 7B, and 7C an isometric view, front view, and right side view, respectively, of a level 700-A with a protective cover 701 for contaminating work environments, is shown according to one or more embodiments. Level apparatus 700-A includes: a body 710 having a longitudinal axis extending a given length and having two side faces, a top surface 730 and a bottom surface, and two end faces with each end face located at the end of the axis; a level bubble vial 124 and/or a plumb bubble vial 134; and a protective cover 701 coupled to body 710, wherein level measurements can be made with the protective cover on the level 700-A.

In the present embodiment, the top surface 730 of level 700-A of the level has structures that form retention structure, e.g., hole 716; and wherein the flexible strip 712 includes a plurality of tabs, or nubs, e.g., barbed fir tree fastener, or push in feet configured nubs 714, for inserting into the holes on the top surface of the body, in order to provide coupling of the flexible strip to the body 710. Flexible strip 712 can also provide protection of level 700-A from drops and bumps.

Figure 7D:
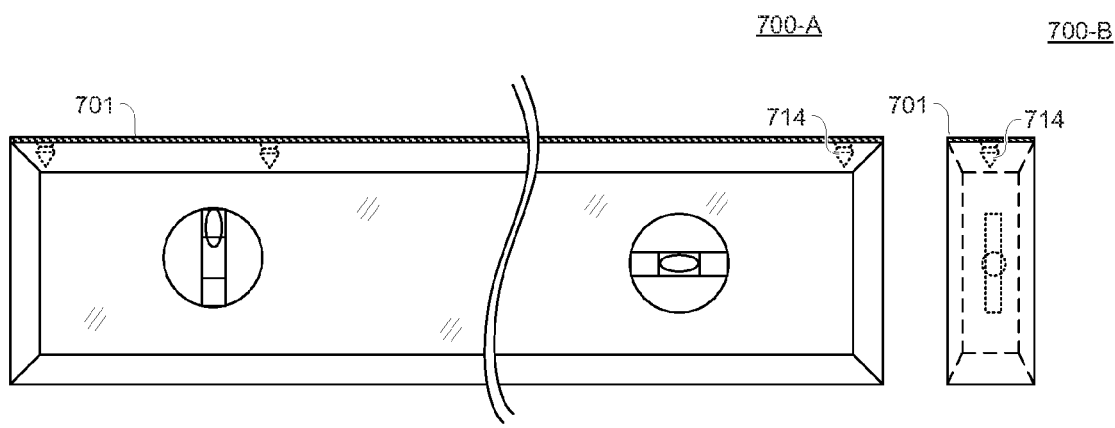
FIG. 7D is a side view of an alternative embodiment protective cover, according to one or more embodiments.
Figure 7D:
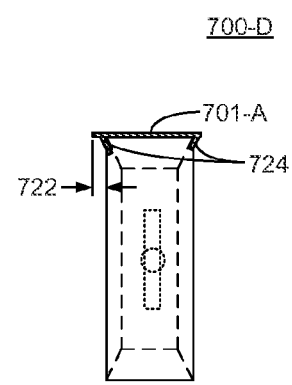

Referring now to FIG. 7D, a side view of a level 700-D with an alternative embodiment protective cover, is shown according to one or more embodiments. Protective cover 701-A has a skirt 724 that pulls across top surface and into side face by a distance of 722 in order to provide a 'hat' type fit over level, with optional nubs, similar to FIG. 7A to supplement the retention of protective cover 701-A on level 700-D. Protective cover 701-A does not cover end faces in one embodiment so as to not interfere with the modular assembly of multiple levels.

Alternative embodiments for protective cover 701 include: a flexible strip; selectively removable from the body; disposable or reusable; is coupled to the top surface of the level for resting an installation piece on the level; flexible strip integrated tongue that fits in groove on top surface running length of level, or flexible strip being wider than the top surface at least for one side face so as to provide a drip edge for the side face of the body in order to reduce contamination of the body and other optional functions of level such as modular ends, adjusting system, retention system, offset gauge system, etc. described herein. Another alternative embodiment provides a low-profile cover, with a tab to remove it and a retainment tang coupled to body of level, that would not interfere with level measurements and reading and that snaps into place and that covers portions of the side face of level over sensitive features such as the adjustment system for angular and translational movement; connector and structure to accept connector in modular ends; etc. Flexible strip 712 can be removed from level 700-A and twisted and curled in order to break off hardened contaminants from a construction job such as tile grout, paint mortar, glue, etc.

Figure 7E:
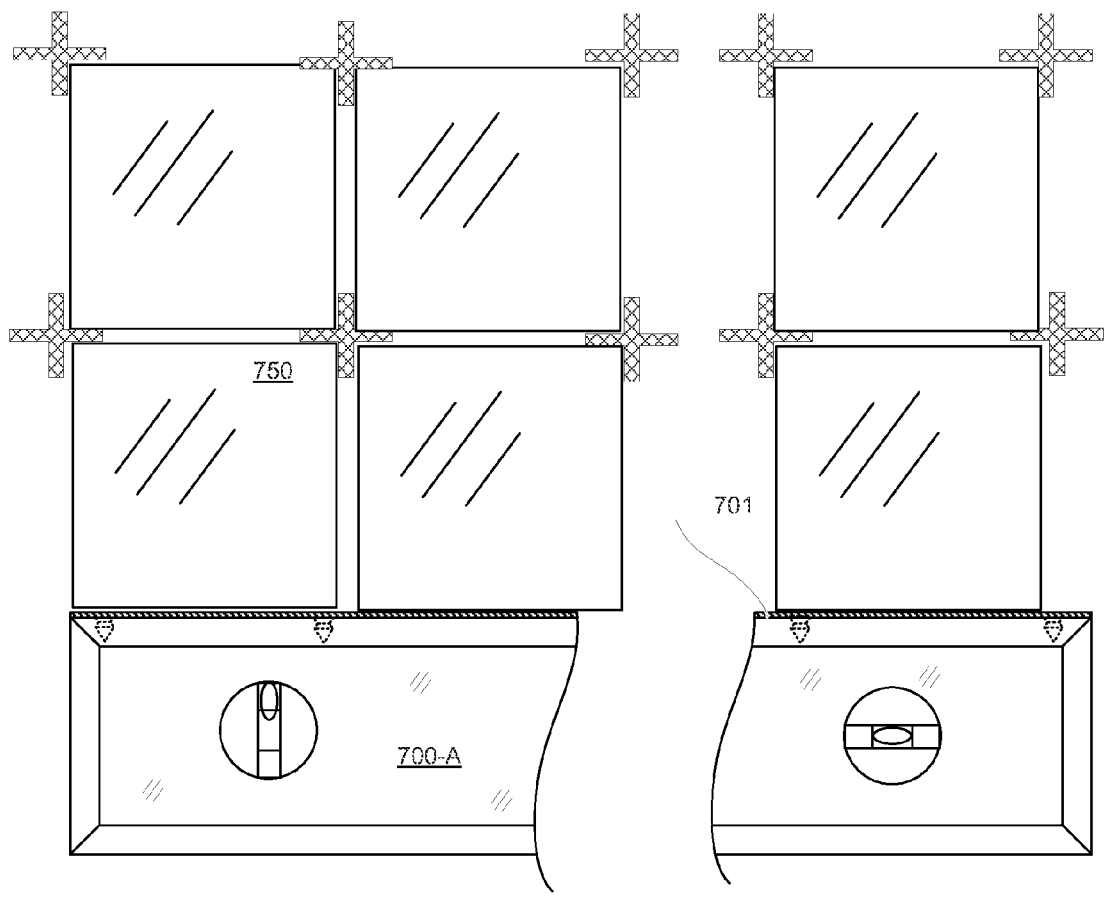
FIG. 7E is a front view of a level with a protective cover being utilized in a contaminated work environment of installing tile, according to one or more embodiments.

Referring now to FIG. 7E is an installation assembly 700-E with a front view of a level 700-A with a protective cover 701 being utilized in a contaminated work environment of installing a plurality of tile 750, is shown according to one or more embodiments. Tile 750 is stacked on top of level 700-A with spacers to position tile to accept grout, wherein the grout application causes drops, spatters, and runoff to gravitationally fall onto level 700-A, thereby contaminating level and any specialized functions on level. Having protective strip 701 to collect grout contamination provides for a quick and easy cleanup by peeling protective strip 701 from level 700-A and then twisting it to crack off any grout, and washing it with water and mild soap will provide a cleaned protective strip 701 that can be reinstalled on level 700-A for future use in a contaminated environment.

Integrated Function Level

Figure 8A:
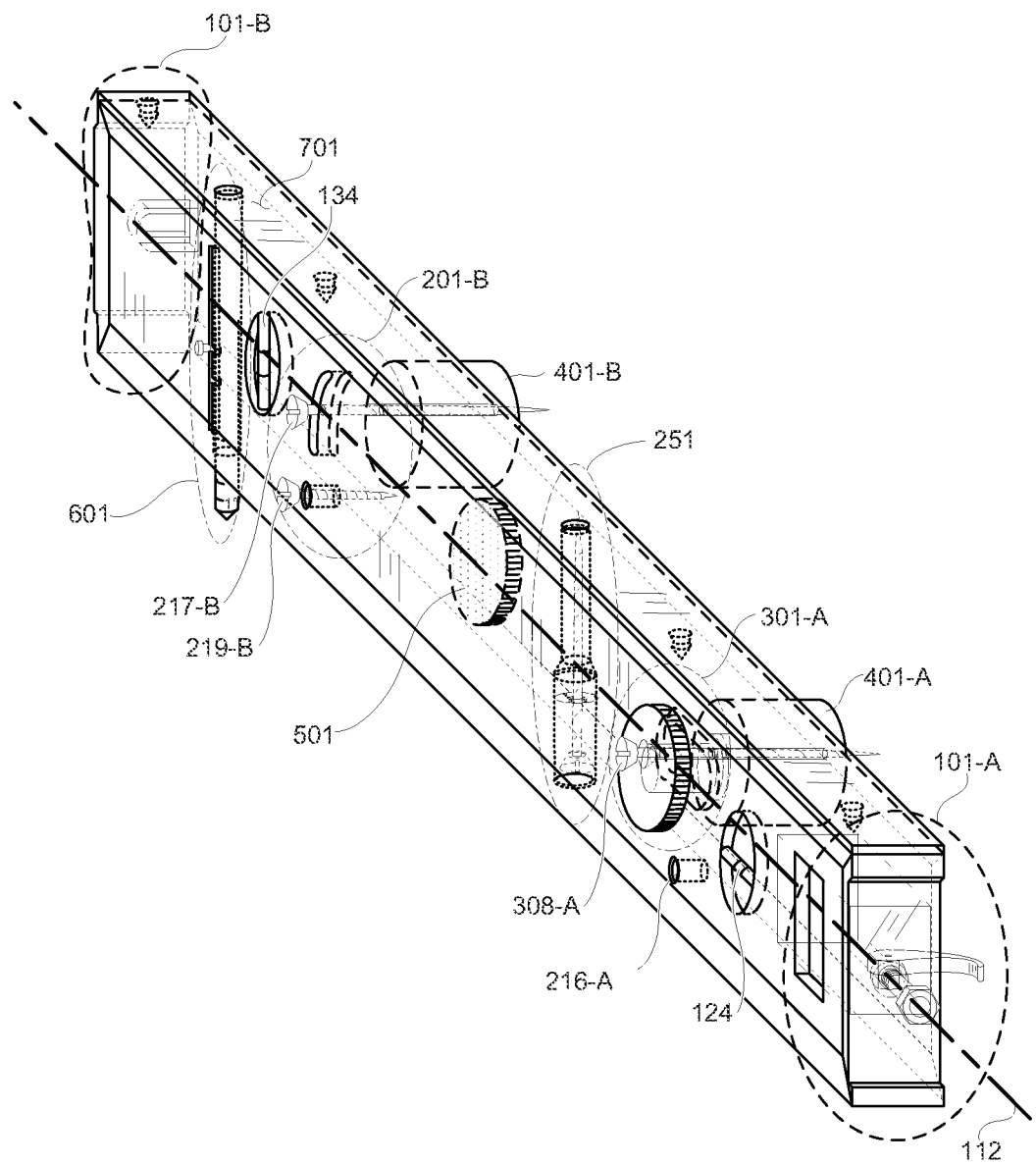
FIG. 8A is an isometric view of a level with integrated features of modular ends, hands-free retention, cam-adjust, pitch gauge, anti-slip, spacer offset, and protective cover, according to one or more embodiments.
Figure 8B:
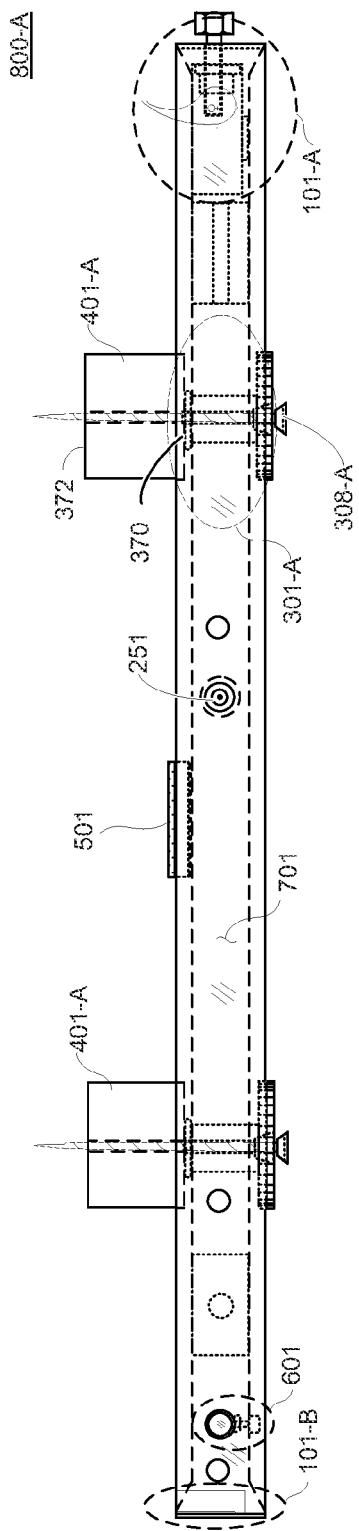
FIGS. 8B and 8C are a top and front view, respectively, of a level with integrated features of modular ends, hands-free retention, cam-adjust, pitch gauge, anti-slip, spacer offset, and protective cover, according to one or more embodiments.
Figure 8C:
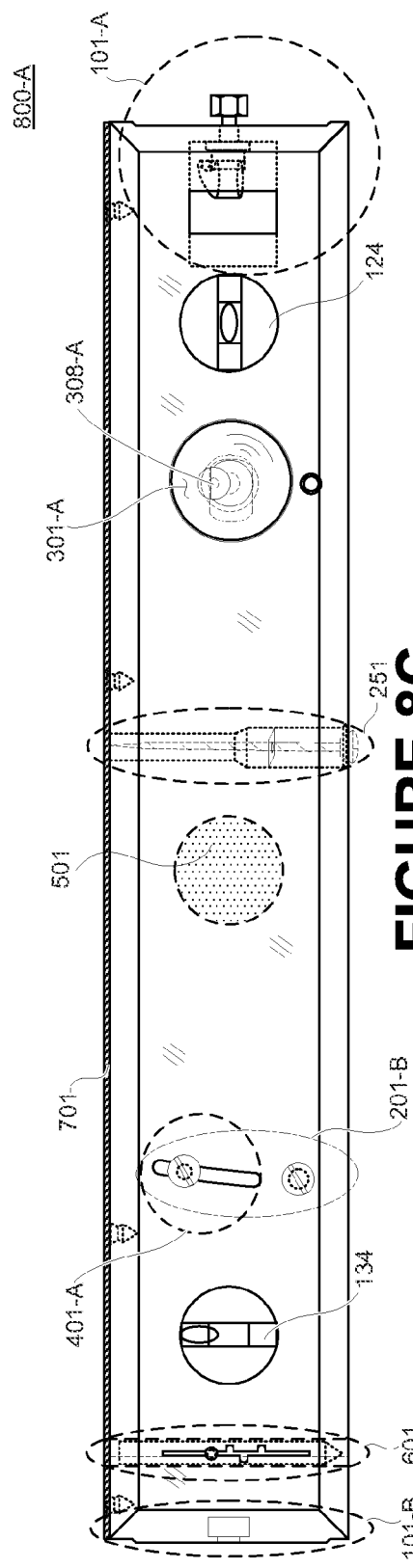

Referring now to FIGS. 8A, 8B and 8C, an isometric, top, and front view, respectively, of a level with integrated features 800-A of: modular ends 101-A and 101-B; hands-free retention system 201-A, 201-B, 216-A, 219-B and 251; linear and translational adjustment system 301-A, spacer offset system 401-A and 401-B; slip-resistant system 501; offset gauge system 601; and protective cover system 701, is shown according to one or more embodiments. FIGS. 8A through 8C provide a compacted level with all noted functions incorporated for purposes of illustration and maximum utility. In actual use, level could be substantially longer with additional spacing between features.

In particular, the present disclosure provides a multi-function tool 800-A that provides level, plumb, and angle measurements, marking and reading with enhanced functionality of: 1) modular ends 101-A and 101-B that allow attachment of mating levels for linear extension or extension into any one of multiple different planes or axes, or for attachment of, or add-on tools; 2) one or more attachment, or retention, devices 201-B, 217-B, 219-B, 216-A, 251, and 308-A to secure the level to the work piece structure or to the installation piece in order to provide hands-free operation for measuring level, plumb, or offset thereby more effectively using manpower resources on a job; 3) one or more linear and translational adjustment devices 301-A, that allow either one end of the level to be adjusted angularly with respect to the other end or allows the entire level to be moved in a combination of parallel translation and/or angular offset in order to reach a desired level, plumb, or pitch as well as a desired location; 4) one or more spacer devices 401-A and 401-B to offset the level from a work piece in any one of multiple sides or faces of level 800-A; 5) one or more slip-resistant system, or non-slip devices, 501 that allow a level to more easily be held against the work or installation piece and adjusted without being knocked or bumped out of position; 6) an offset system 601 to determine a variable or preset pitch or offset of a work piece or installation piece from level or plumb; 7) a protective cover 701 on the level that allows accurate level measurements while protecting other areas of the level from contamination and providing quick and easy cleanup of the level; and any combination thereof.

While level 800-A illustrates the combination of all seven features, a level can provide any combination of any amount of these individually disclosed functions and features to provide a balance of functionality with product cost and application usefulness. Thus, different level systems are possible with the present disclosure having a combination of any two features, any three features, any four features, any five features, any six features, or all seven features, as ordered by a marketing plan, or as ordered by a consumer from a customizable and flexible manufacturing order system. Also, the body of the level can be designed and fabricated with all the cutouts and formation but without the hardware to enable those features; the hardware can be added in the future for additional functionality, should it be desired later, e.g., with an add-on upgrade kit. In another embodiment, disclosed functions and features can be provided modularly as add on levels of shortened or normal length that couple to a base level used for basic level and plumb applications. A synergy arises from combining any or all functions and features disclosed. For example benefits from functions include: modular level allows the extension of the level system into longer lengths or into different axes to provide a stable, simultaneous measurement and reading; hands-free retention operation reduces manpower requirements for a job; linear and angular adjustment provides a quick and easy adjustment of level without the repetition of tapping level, having level slip, and repeating the process; offset spacer allows level to be offset from a work piece in order to provide room for an installation piece to be inserted against work piece; slip-resistant system provides predictable stiction of level to a work piece or installation piece in order to prevent accidental slipping of level once a desired level position is attained; offset gauge system allows for quick, accurate, and consistent slope readings; and cover feature provides protection of the level, which can be costly and sensitive to contamination and damage.

Functions

Figure 9:
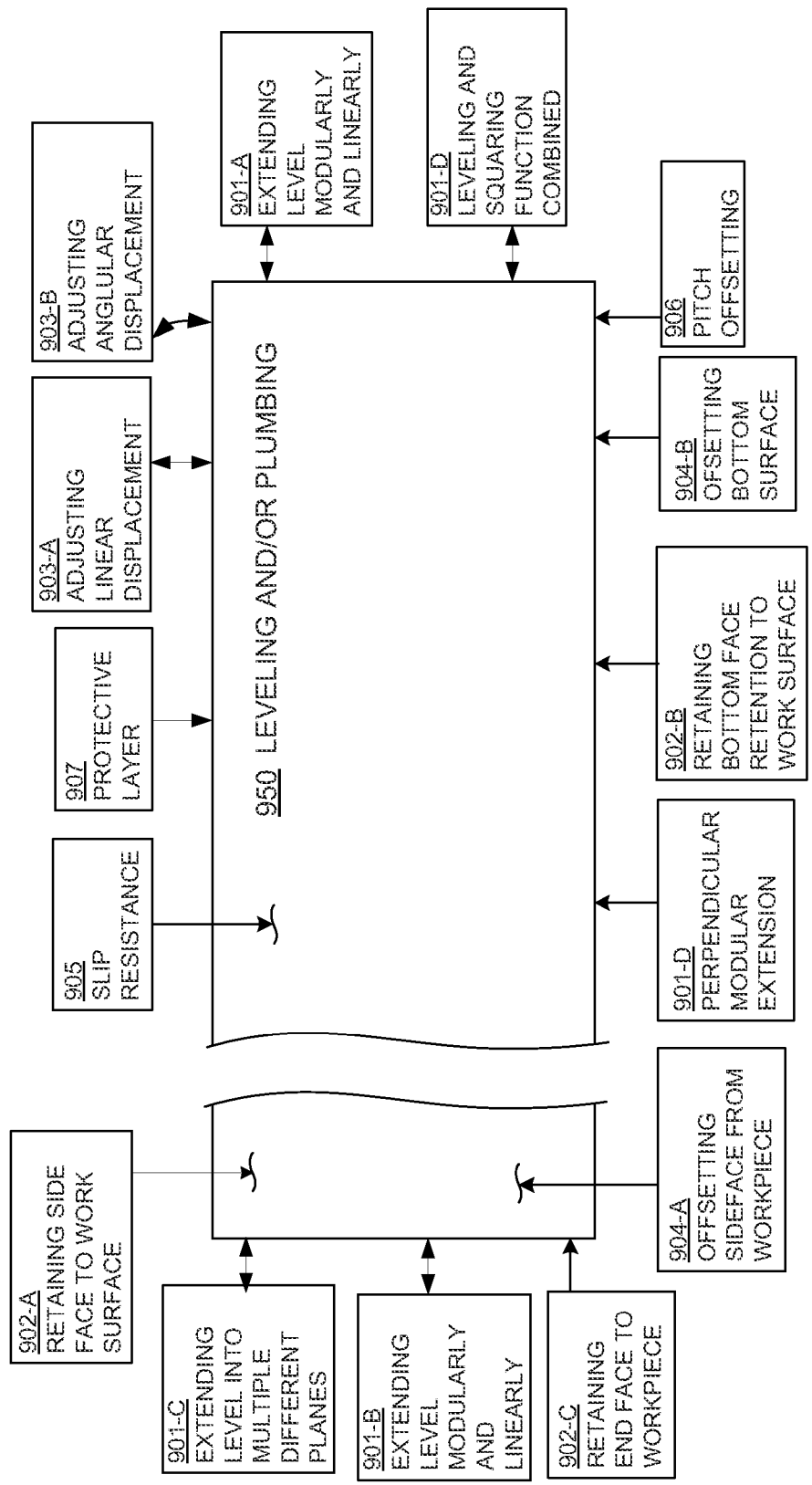
FIG. 9 is a functional block diagram of a level for measuring and marking level, plumb and offset, according to one or more embodiments.

Referring now to FIG. 9, a functional block diagram 900 for advanced features in leveling and plumbing functions 950 is shown according to one or more embodiments. One embodiment provides a function 901-A and 901-B of extending a level modularly and linearly in one or more coaxial directions by way of coupling a plurality of modular levels to each other with a result of creating a level assembly from easily transportable and storable modular pieces that together span wide distances for contiguous level or plumb measurements or marking. Functions 901-A and 901-B are implemented in embodiments illustrated in FIG. 1A through 1W and FIG. 10C.

Another embodiment provides functions 901-C and 901-D of extending a level modularly in multiple different orthogonal planes for measurements, marking or reading non-contiguous leveling, plumbing, or squaring. These functions are accomplished by way of coupling a plurality of modular levels to each other in two or more orthogonal axes with a result of creating a level assembly from easily transportable and storable modular pieces that together span orthogonal planes for non-contiguous level or plumb measurements or marking. Functions 901-C is implemented in embodiments illustrated in FIGS. 1X through 1AD, and FIGS. 10A, 10B, and 10D.

Functions 902-A through 902-C provide embodiments of retaining level side face, level top or bottom face, and level end face, respectively, to a work piece or an installation piece. These functions are accomplished by way of coupling one or more modular levels to the work piece or installation piece with a result of providing hands-free measuring and marking of level, plumb, and square or any combination thereof. Function 901-C is implemented in embodiments illustrated in FIGS. 2A through 2H. When combined with other functions, the retaining function 902-A and 902-B appears in FIGS. 3A through 3F, 4B-4E, 8A-8C, and 10A-10D.

Functions 903-A and 903-B provide embodiments of adjusting linear and angular displacement of a level, respectively, against a work piece or an installation piece. These functions are accomplished by way of an adjustable positioning device coupled to both the level and to the work piece or installation piece with a result of allowing linear and angular displacement between the two. Functions 903-A and 903-B are implemented in embodiments illustrated in FIGS. 3A through 3H, 4C through 4E, 8A through 8C, and 10C.

Function 904-A and 904-B provide embodiments of offsetting side face and bottom face, respectively, of level from work piece or installation piece. These functions are accomplished by way of spacers or offsets coupled to the level, and optionally coupled to the work piece or installation piece with a result of providing clearance for the actual installation piece or from the work piece yet allowing leveling or plumbing functions at convenient locations. Functions 904-A and 904-B are implemented in embodiments illustrated in FIGS. 4A through 4E, 6A through 6E, 8A through 8C, and 10B and 10C.

Function 905 provides an embodiment of slip resistance to leveling, plumbing, measuring, and marking functions 950. Slip resistance function 905 is accomplished by way of contact surfaces with slip-resistant properties integrated on a level that interface with an installation or work piece, e.g., by providing a higher coefficient of static and/or dynamic friction than otherwise provided by a level, with a result of reducing slippage and mismarking or mismeasuring of level, plumb, or given angle. Function 905 is implemented in embodiments illustrated in FIGS. 5A through 5E, and 8A through 8C.

Function 906 provides an embodiment of pitch offsetting to leveling, plumbing, measuring, reading, and marking functions 950. Pitch offsetting function 906 is accomplished by way of a premeasured offset device, coupled to the level, with selectively providing a range of offsets desired per building code or personal preference having a result of more accurate and of simplified slope evaluation using a go/no-go reading. Function 906 is implemented in embodiments illustrated in FIGS. 6A through 6E and FIGS. 8A through 8C.

Function 907 provides an embodiment of protection via a protective layer for level that is accomplished by way of a physical layer of material on level that can be removed and cleaned. The result is a better maintained level tool with less contamination obscuring the level or plumb vial and with less contamination on surfaces such as the top and bottom surface that would cause erroneous level or plumb readings, measuring, or marking. Thus, the result is a leveling and plumbing function with more consistent and accurate measurements, markings, and readings. Function 907 is implemented in embodiments illustrated in FIGS. 7A through 7E, and 8A through 8C.

Function 908 provides an embodiment of combining any of the above functions together for use in measuring, marking or reading a leveling and/or plumbing and/or squaring function. Thus, any combination of functions such as: modular assembly, retaining, linear or angular displacement, slip resistance, pitch offsetting, and contamination protection can be provided to result in a tool with a synergistic effect in efficiency from use of multiple advanced features together. For example, the use of modular levels combined in an assembly, with offsets, retainment, and linear/angular adjustment functions, as illustrated in FIG. 10C, allows a contiguous level installation of multiple windows spanning a substantial distance wherein the level is retained to the work piece, the wall, for hands-free level measurement during installation, wherein the level is quickly and easily adjusted to a level reading using linear and angular adjustments, wherein the level is offset from the work piece to allow clearance for the installation piece, e.g., the windows, and wherein the retainment function allows the level to support the weight of the installation piece windows to provide a setup position for the installation piece windows that defaults to a level position. Means for enabling functions of FIG. 9 include the structures and methods disclosed herein and their equivalents.

Installation Applications

Figure 10A:
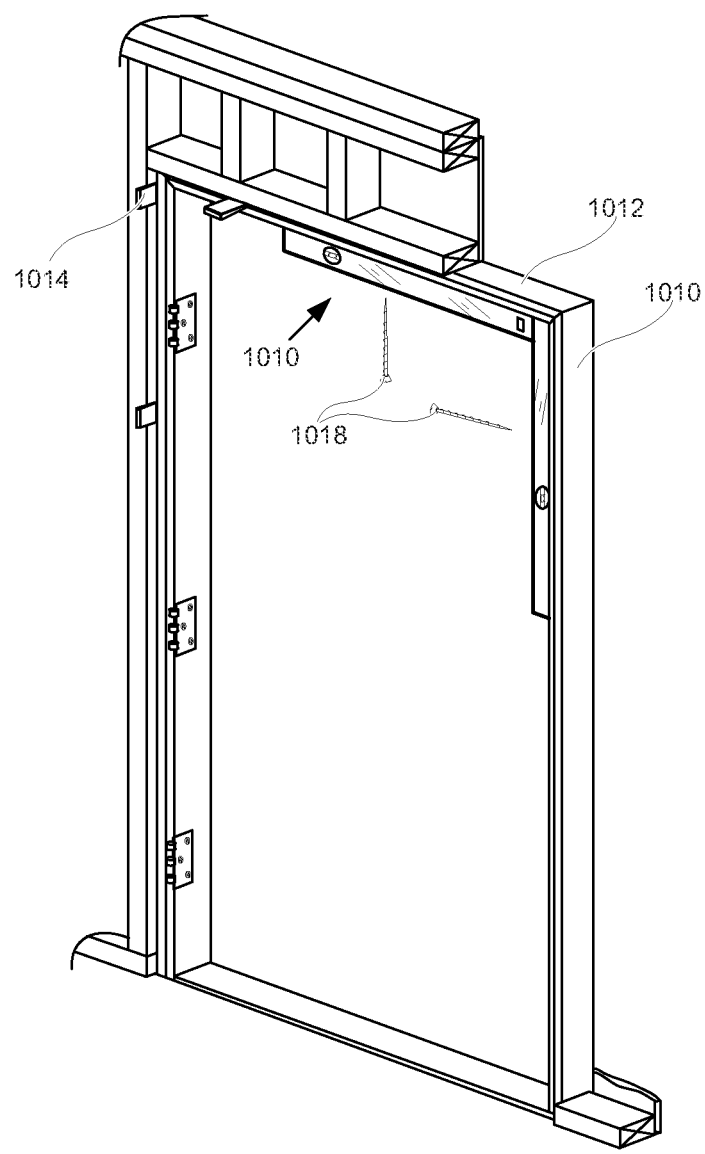
FIG. 10A is an isometric view of modular levels configured as a framing square and being applied to measure level and plumb for a pre-hung door frame installation, according to one or more embodiments.

Referring now to FIG. 10A an isometric view of doorframe installation 1000-A using modular levels configured as a framing square modular level 1010 to measure both level and plumb, is shown according to one or more embodiments. Framing square modular level 1010 can be retained to door frame using one or more fasteners 1018 that are long enough to engage the door frame but short enough to not engage wall frame studs, thereby allowing the use of shims 1014 to obtain the proper level and plumb of doorframe. In particular, one fastener 1018 may be used to secure just one leg of framing square modular level 1010, e.g., to the vertical 1012 portion of doorframe, and let the other leg of the framing square modular level 1010 float. Then level can first be obtained, with plumb being obtained by eliminating any gap between vertical leg of framing square modular level 1010. Alternatively, framing square modular level 1010 can be secured to both vertical frame 1010 and horizontal frame 1012 components of doorframe, but care should be used in positioning doorframe to avoid overstressing the framing square modular level 1010. Beneficially, following the successful doorframe installation, framing square modular level 1010 can be disassembled for transport and/or utilized with the same or other functions in other applications for plumb, level, offsets, etc.

Figure 10B:
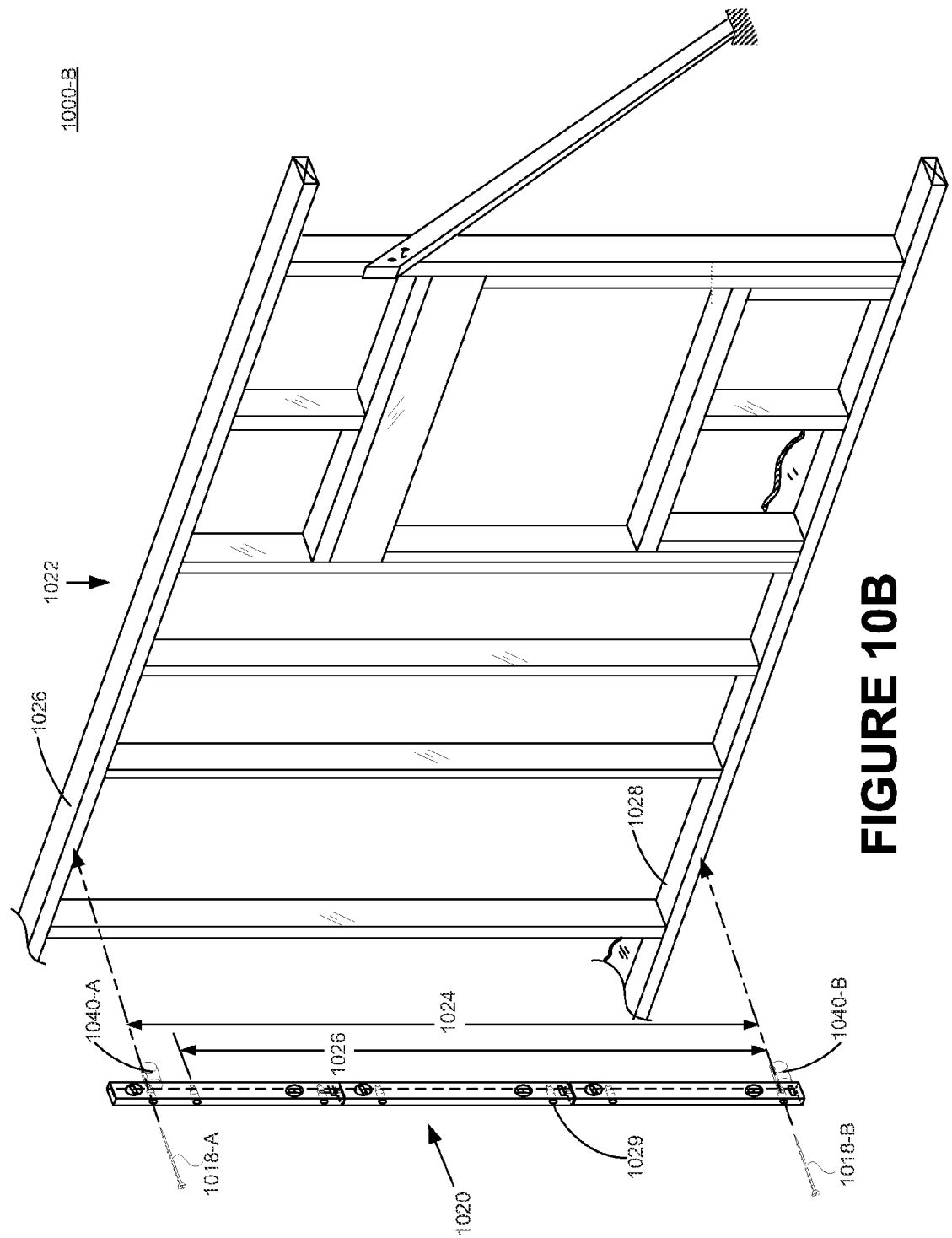
FIG. 10B is an isometric view of a wall installation using modular levels configured as a modular plate level with spacer offsets for measuring plumb, according to one or more embodiments.

Referring now to FIG. 10B an isometric view of a wall installation 1000-B using modular levels configured as a modular plate level 1020 with spacer offsets 1040 and one or more fasteners 1018 for retaining modular plate level 1020 to wall 1022 to measuring plumb, is shown according to one or more embodiments. Wall 1022 is plumbed by securing modular plate level 1020 preferably with only a single fastener 1018-A though spacer 1040-A on the top plate 1026 with spacer 1040-B resting against bottom plate 1028 thereby allowing level to be retained, yet float and avoid warping or damaging it, as the wall is moved, flexed, and secured. Beneficially, following the successful window installation, modular plate level 1020 can be disassembled for transport and/or utilized with the same or other functions in other applications for plumb, level, offsets, etc.

Referring now to FIG. 10C an exploded view of window installation 1000-C performed using modular levels coupled together and configured as an elongated installation-plane level assembly 1038 with spacer offsets 1040-C through 1040-G and retention connectors 1018 for creating a level installation-plane on which two similar windows 1030-A and 1030-B can be installed on a same wall, is shown according to one or more embodiments. In particular, modular level assembly combines two or more individual modular levels together and utilizes spacers 1040-C through 1040-G to create a gap between wall 1036 and level assembly 1038 in order to accommodate flanges 1035-A and 1035-B of windows 1030-A and 1030-B that will be positioned between level assembly 1038 and wall 1036, while allowing sill 1037-A and 1037-B of windows 1030-A and 1030-B to rest on top surface of installation-plane level assembly 1038 as shown by dashed install lines. Fasteners install through body of level and through spacers 1040-C through 1040-G into studs of wall 1036 and additional fasteners may optionally be installed through retention holes in body of levels and into studs of wall 1036 to provide additional rigidity and support in order to prevent warping and damage to level assembly 1038 and windows 1030-A and 1030-B. Elongated installation-plane level assembly 1038 can be used for parallel measurement, marking, or reading of level, plumb, or offset any parallel application, including those on intersecting walls, e.g., where window applications occur on intersecting walls straddling an inside corner or an outside corner. Beneficially, following the successful window installation, installation-plane level assembly 1038 can be disassembled for transport and/or utilized with the same or other functions in other applications for plumb, level, offsets, etc.

Figure 10D:
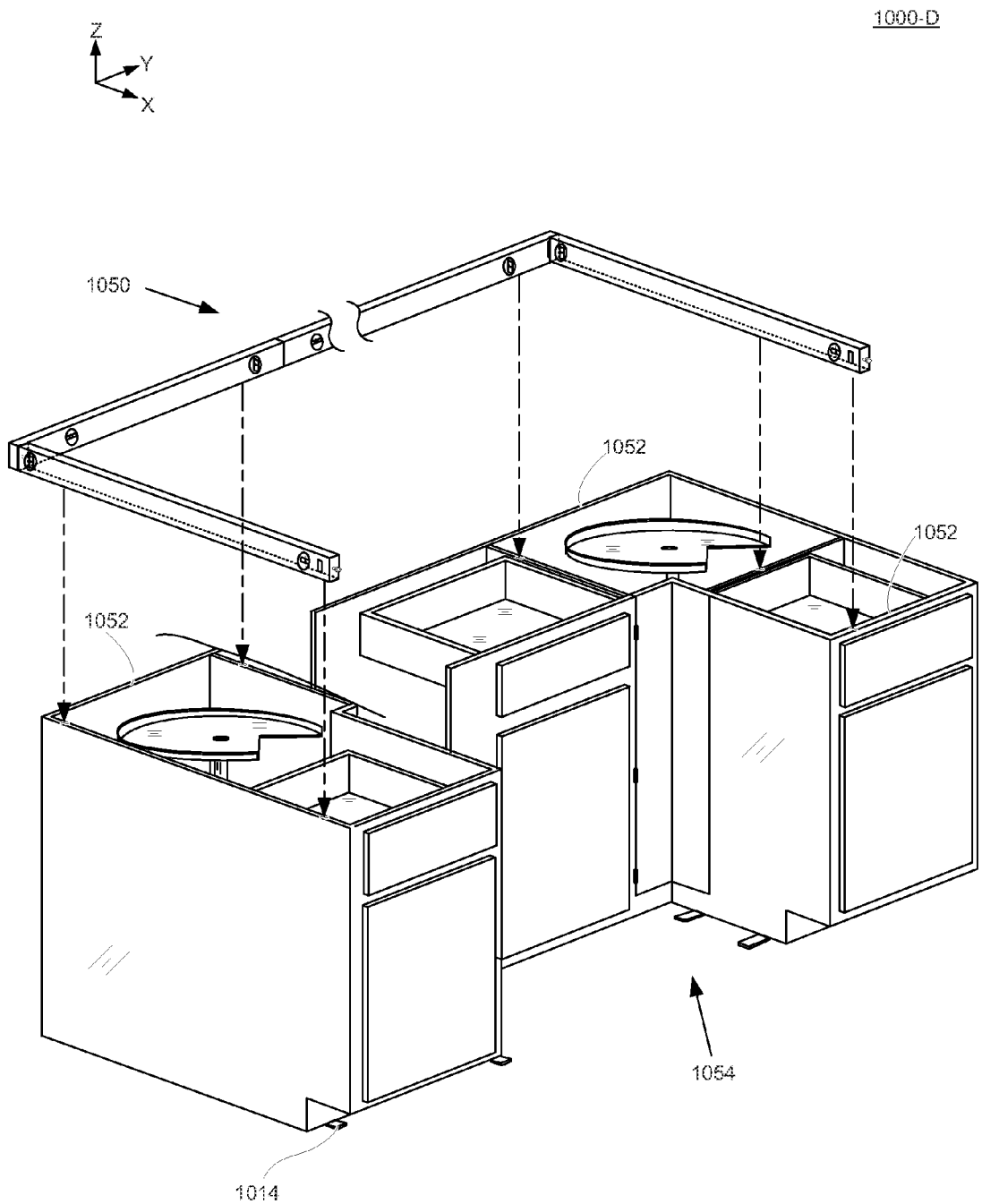
FIG. 10D is an isometric view of modular levels configured as a two-axis U-shaped level assembly for measuring level of a base cabinet installation, according to one or more embodiments.

Referring now to FIG. 10D an isometric view of a base cabinet installation 1000-D using modular levels coupled together and configured as a two-axis U-shaped square level assembly 1050 for measuring level top surface 1052 of base cabinets 1054, is shown according to one or more embodiments. The U-shaped level assembly 1050 is created by coupling a plurality of modular levels, e.g., a minimum of three levels and a total of four levels in the present embodiment, to form a "U" shape with legs forming right angles. In particular, U-shaped modular level assembly 1040 is placed on top surface 1052 of base cabinets 1054 and read to confirm level surface for subsequent countertop installation. Optionally, fasteners (not shown) may be utilized to loosely or rigidly affix U-shaped modular level assembly 1040 to base cabinets 1054 for stability. Shims 1014 may be utilized to then adjust portions of base cabinet that need to be raised in order to create a consistently flat and level top surface 1052. U-shaped modular level assembly 1040 provides inherent stability in the U-shape, thus providing level in multiple planes. Thus, U-shaped modular level assembly 1040 will not fall over as would multiple unattached independent levels placed in different areas of top surface 1052 of base cabinets 1054. Beneficially, following successful leveling of base cabinets 1054, U-shaped modular level assembly 1040 can be disassembled for transport and/or utilized in other applications for plumb, level, offsets, etc. Alternatively, modular levels may be combined to close the U shape and make a box shape level assembly, e.g., four modular levels combined at right angles to each other, for inherent stability and multi-axis level, plumb, and offset measurement, marking, and reading. The term square refers to a ninety degree angle between members rather than an equal-sided rectangle.

Alternative embodiments include where one or more of the plurality of spacers, e.g., a first and second spacer, are: permanently fastened to the first and second level selectively; are selectively removable from the first and/or second level; selectively positionable apart from each other by a range of distances including standard heights of walls of a building, e.g. via having different position attach points on the level for the spacers, or by having slots on the level along the axis or along other axes; have a longitudinal axis that is parallel to an axis of a plumb vial coupled to at least one of the plurality of levels; spaced apart from each other a distance approximately equal to a standard height of walls of a building, e.g., eight, nine, or ten feet; spaced apart wide enough to accommodate an installation piece between the level system and the work piece upon which the installation pieces will be installed; spaced apart to accommodate a plurality an installation pieces on a single continuous and/or level plane formed by the level system (can have additional spacers beyond the first and second spacer);

Level can be fabricated of any suitable material, including inorganic materials such as metal, e.g., aluminum, etc. or organic materials such as plastic, laminate, etc. that will maintain structural integrity and dimensional stability in different temperatures and humidity conditions, while being robust in the field, e.g., resist breaking and bending from falls and bumps, and from work loads being placed upon it. Level embodiments herein can be integrated with: digital readout of level, plumb, or angle; laser pointer functions, etc.

The present description is applicable to a wide variety of applications and is not limited to any particular type of materials, measurement markings, hinge or pivot type, sizes or geometries of surfaces other than the straightedges 10A and 10B or the bottom surfaces 24A and 24B. Rather, the present description is applicable to a wide variety of materials, measurement markings, geometries, hinges and pivot types and arrangements that meet the marking functions listed herein.

The foregoing descriptions of specific embodiments of the present disclosure have been presented for purposes of illustration and description. They are not intended to be exhaustive or to limit the invention to the precise forms disclosed. Many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A level apparatus comprising:
   a body having a longitudinal axis and a plurality of faces including two side faces, a top and a bottom face, and two end faces, wherein each end face is located at the end of the longitudinal axis, wherein a jointed end is disposed on at least one of the plurality of faces;
   at least one level indicator coupled to the body and visible on the at least one side face of the body, the level indicator for displaying the amount of inclination; and
   wherein the jointed end includes a structure to hold a connector or to selectively receive another connector from another level to be selectively coupled to the level apparatus in a manner that only applies a load to the jointed end.

2. The level apparatus of claim 1 further comprising:
   a connector, or a structure to receive another connector, disposed in the jointed end of the body such that the level can be coupled to another level; and
   wherein the connector, or the structure to receive another connector, is configured to place a load on the level in a direction collinear with the longitudinal axis of the body.

3. The level apparatus of claim 1 wherein the connector or the structure to receive another connector will provide a compressive load on the end face of the level when coupled to another level, or wherein the connector will receive a tension load when coupled to another level.

4. The level apparatus of claim 1 wherein the body of the level, apart from the end face, will have no load from coupling the level to another level.

5. The level apparatus of claim 1 wherein the connector is comprised of:
   a post having at least a partially threaded portion that can be turned to increase tension on the post, wherein the post has a first end and a second end, and wherein the post is releasable or retractable;
   wherein the first end is anchored into the level and coupled to a folding lever having a cam pivot to provide tension on the post; and
   wherein the second end of the post is capable of being anchored into a second level.

6. The level apparatus of claim 1 wherein the connector is a strap that provides tensional force via an elastomeric material composition or as a non-stretchable strap secured to the level by a winch.

7. The level apparatus of claim 5 wherein the jointed end of the body has at least one mating surface with a composite normal vector, when coupled to another level, which is parallel or coplanar with the longitudinal axis of the body.

8. The level apparatus of claim 1 wherein the jointed end of the level contains at least one item from the group of: a convex conical shape, and a concave conical shape; and
   wherein the concave component is shaped to accept a convex conical shape, thereby providing centering.

9. The level apparatus of claim 1 wherein both end faces of the body have a jointed end for combining with another level.

10. A level system comprising:
    a plurality of levels, wherein each of the plurality of levels has a body and a longitudinal axis along a length of the level and has at least one jointed end capable of being coupled to another level;
    means for coupling at least two of the plurality of levels to adjustably pull the jointed ends of the at least two of the plurality of levels together in compression.

11. The level system of claim 10 wherein the plurality of levels includes:
    a first level having at least one jointed end;
    a second level having at least one jointed end;
    wherein the jointed end of the first level is combinable to the jointed end of the second level such that the longitudinal axis of the first level is collinear with the longitudinal axis of the second level; and
    wherein the means for coupling pulls the jointed end of the first level and the jointed end of the second level together in compression.

12. The level system of claim 10 wherein the plurality of levels are coupled linearly to form a plate level for measuring plumb of a wall.

13. A level apparatus comprising:
    a body having a longitudinal axis and a plurality of faces including two end faces, wherein each end face is located at an end of the longitudinal axis, wherein a jointed end is disposed on at least one of the end faces;
    at least one level indicator coupled to the body; and
    wherein the jointed end includes a structure to hold a connector or to selectively receive another connector from another level that only applies a load to the jointed end; and
    a connector, or a structure to receive another connector, disposed in the jointed end of the body such that the level can be coupled to another level.

14. The level apparatus of claim 13 further comprising:
    wherein the connector, or the structure to receive another connector, is configured place a load on the level in a direction collinear with the longitudinal axis of the body.

15. The level apparatus of claim 13 wherein:
    a first jointed end is located on an end face; and
    a second jointed end is located on another face, wherein the end face and the another face are orthogonal to each other.

16. The level apparatus of claim 11 further comprising:
    means for tension loading a connector to join the first level and the second level.

17. The level apparatus of claim 11 wherein:
means for aligning a longitudinal axis of the first level with a longitudinal axis of the second level.

18. The level apparatus of claim 11 wherein:
means for providing the body of the level with no load when implementing the means for coupling the at least two of the plurality of levels.

19. The level apparatus of claim 11 wherein:
means for elastically coupling the at least two of the plurality of levels.

20. The level apparatus of claim 11 wherein:
means for aligning a top and bottom face of the first level with a top and bottom face of the second level.

* * * * *